US011274539B2

(12) United States Patent
Jensen et al.

(10) Patent No.: US 11,274,539 B2
(45) Date of Patent: Mar. 15, 2022

(54) HEATED SEPARATION ASSEMBLY

(71) Applicant: WESTERMAN, INC., Bremen, OH (US)

(72) Inventors: Nicholas Lee Jensen, Talala, OK (US); Spencer Scott Bruner, Owasso, OK (US); Derek Rupp, Owasso, OK (US)

(73) Assignee: WESTERMAN, INC., Bremen, OH (US)

( * ) Notice: Subject to any disclaimer, the term of this patent is extended or adjusted under 35 U.S.C. 154(b) by 365 days.

(21) Appl. No.: 16/396,851

(22) Filed: Apr. 29, 2019

(65) Prior Publication Data
US 2020/0340347 A1 Oct. 29, 2020

(51) Int. Cl.
*E21B 43/34* (2006.01)
*B01D 19/00* (2006.01)
*B01D 17/04* (2006.01)
*F28D 15/00* (2006.01)
*B01D 17/02* (2006.01)

(52) U.S. Cl.
CPC .......... *E21B 43/34* (2013.01); *B01D 17/0211* (2013.01); *B01D 17/0214* (2013.01); *B01D 17/042* (2013.01); *B01D 19/0042* (2013.01); *F28D 15/00* (2013.01)

(58) Field of Classification Search
CPC ............ B01D 19/0042; B01D 17/0211; B01D 17/0214; B01D 17/042; E21B 43/34
USPC .......... 210/180, 187, 539, 540; 96/183, 184, 96/185; 166/75.12
See application file for complete search history.

(56) References Cited

U.S. PATENT DOCUMENTS

| | | | | |
|---|---|---|---|---|
| 2,179,131 | A * | 11/1939 | Millard | C10G 33/06 210/187 |
| 2,358,508 | A | 9/1944 | Hersh | |
| 2,825,422 | A * | 3/1958 | Schoenfeld | C10G 33/06 210/187 |
| 2,868,313 | A * | 1/1959 | Leuszler | C10G 33/06 210/180 |
| 3,119,674 | A * | 1/1964 | Clarence | E21B 43/34 96/184 |
| 3,876,396 | A | 4/1975 | Arnold | |
| 4,767,424 | A | 8/1988 | Mcewan | |
| 4,919,777 | A * | 4/1990 | Bull | B01D 17/0208 210/180 |
| 6,386,520 | B2 | 5/2002 | Mcewan | |
| 7,459,001 | B2 | 12/2008 | Christiansen et al. | |
| 7,488,361 | B2 | 2/2009 | Lamholm | |
| 7,931,719 | B2 | 4/2011 | Sams et al. | |
| 8,216,331 | B2 | 7/2012 | Mller et al. | |
| 8,470,080 | B1 | 6/2013 | Ball, IV et al. | |
| 8,627,848 | B2 | 1/2014 | Bambara | |

(Continued)

*Primary Examiner* — Christopher Upton
(74) *Attorney, Agent, or Firm* — Moore & Van Allen PLLC

(57) ABSTRACT

Provided is an indirect heated separation assembly that includes a vessel having a heating section and a separation section, a plate separating the heating section from the separation section, the plate being configured to be heated by a heating fluid in the heating section to provide indirect heat to the separation section, and a coil assembly disposed in the heating section, the coil assembly including an inlet configured to receive a process fluid and an outlet in communication with an inlet of the separation section to direct the process fluid after heating to the separation section.

17 Claims, 24 Drawing Sheets

(56) References Cited

U.S. PATENT DOCUMENTS

| | | | |
|---|---|---|---|
| 9,643,105 B1 | 5/2017 | Walker et al. | |
| 2003/0000186 A1 | 1/2003 | West | |
| 2003/0150324 A1 | 8/2003 | West | |
| 2007/0044437 A1 | 3/2007 | Larnholm et al. | |
| 2007/0137154 A1 | 6/2007 | Agnello et al. | |
| 2008/0290532 A1 | 11/2008 | Kooijman et al. | |
| 2009/0078118 A1 | 3/2009 | Kooijman | |
| 2015/0266145 A1 | 9/2015 | Valsler et al. | |
| 2015/0306523 A1 | 10/2015 | Ball, IV | |
| 2020/0340338 A1* | 10/2020 | Jensen | B01D 19/0042 |
| 2020/0340347 A1 | 10/2020 | Jensen et al. | |
| 2020/0340348 A1 | 10/2020 | Jensen et al. | |

* cited by examiner

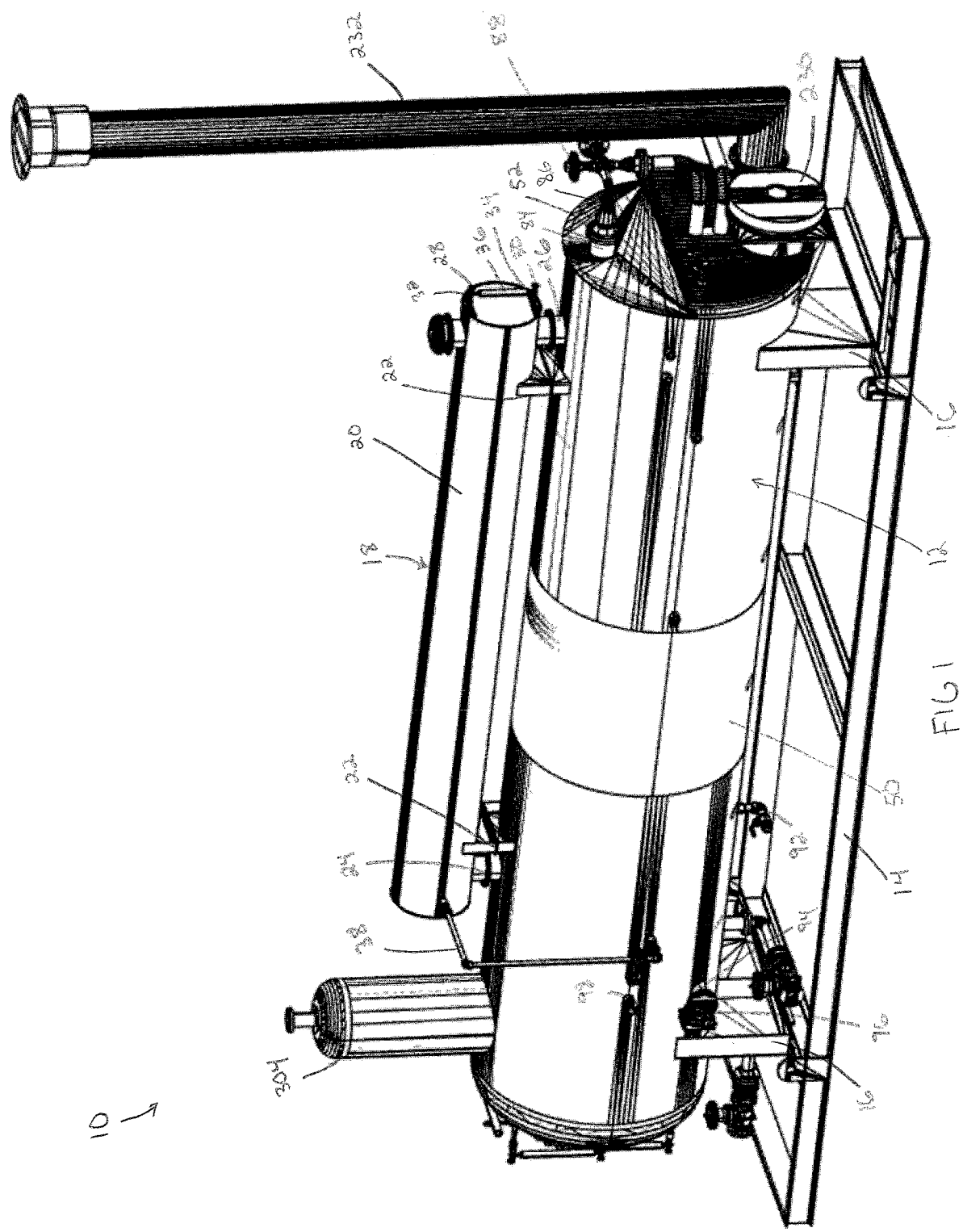

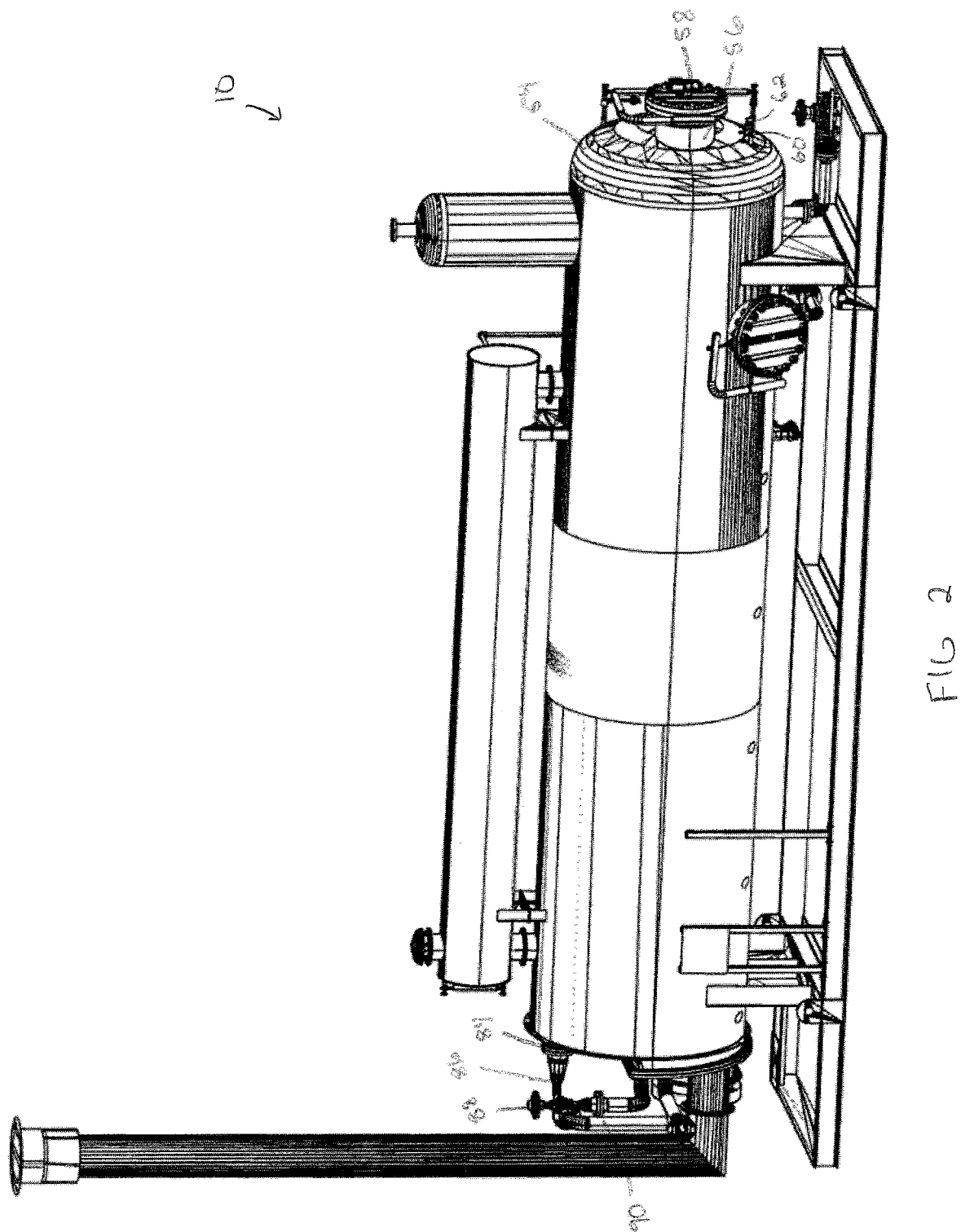

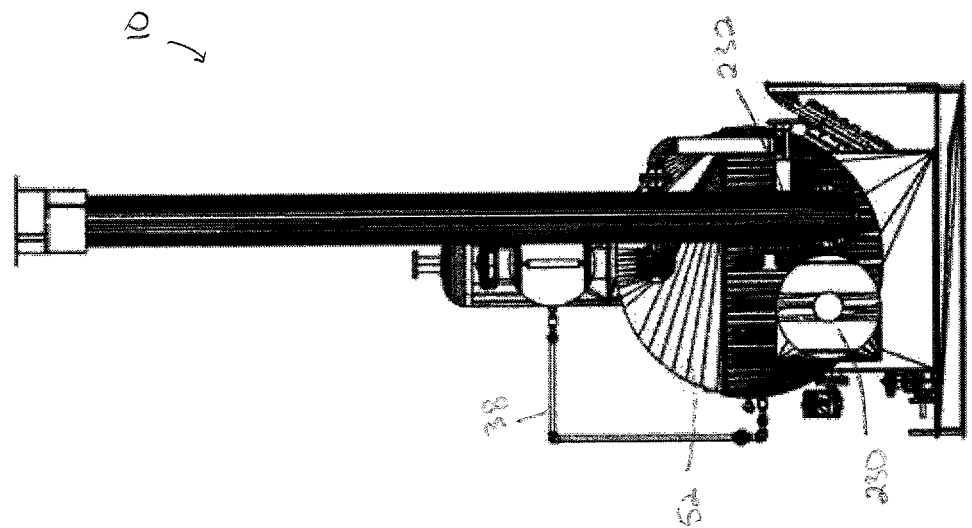
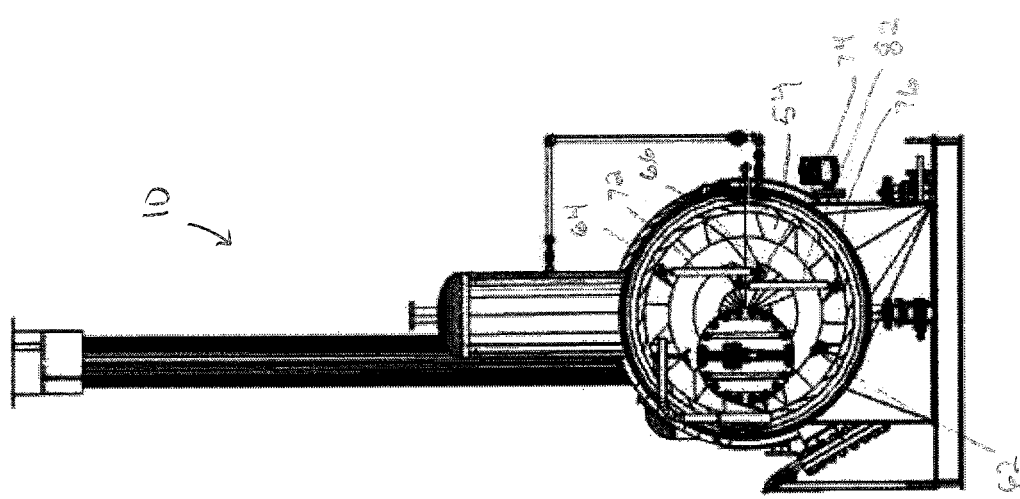

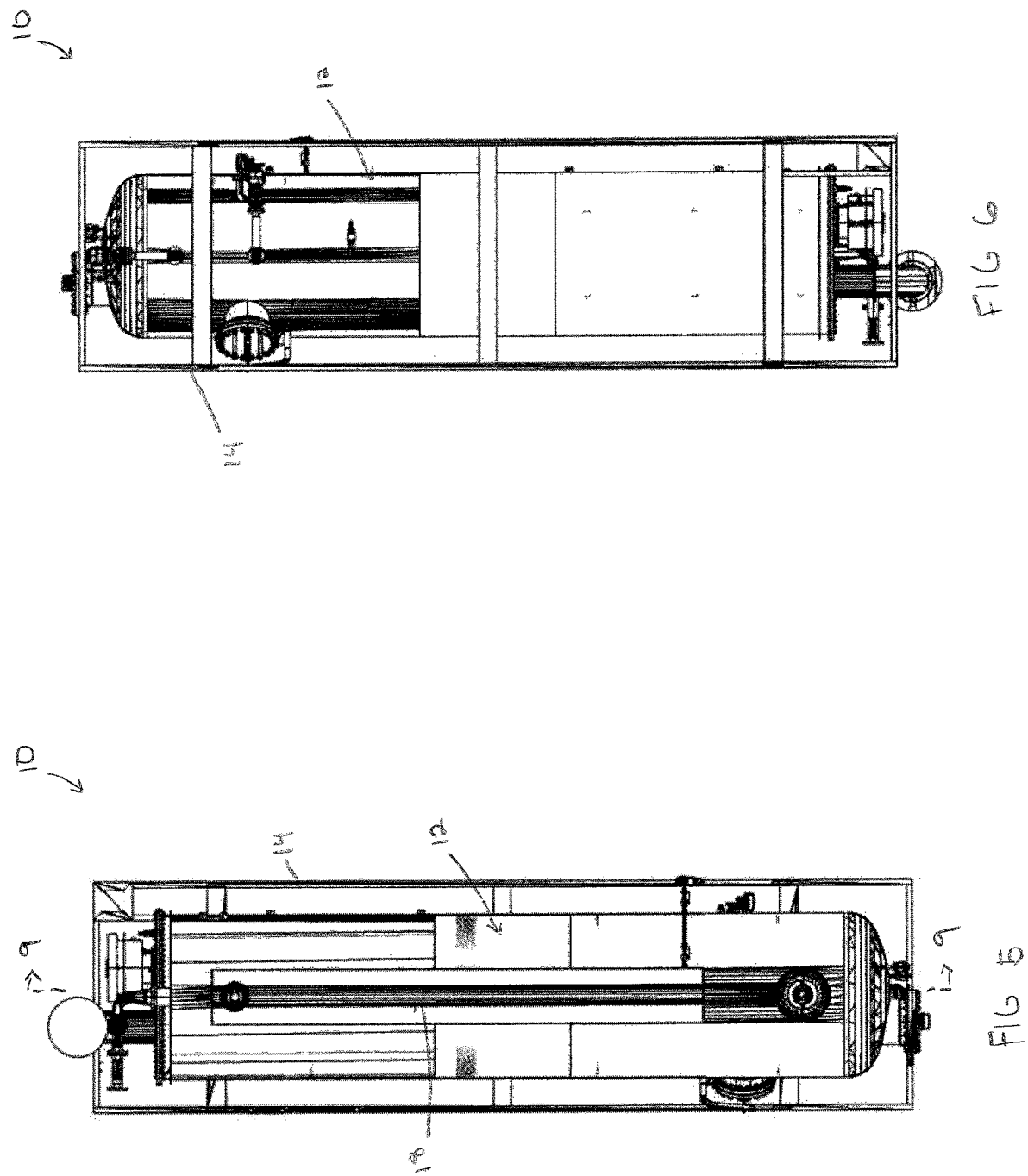

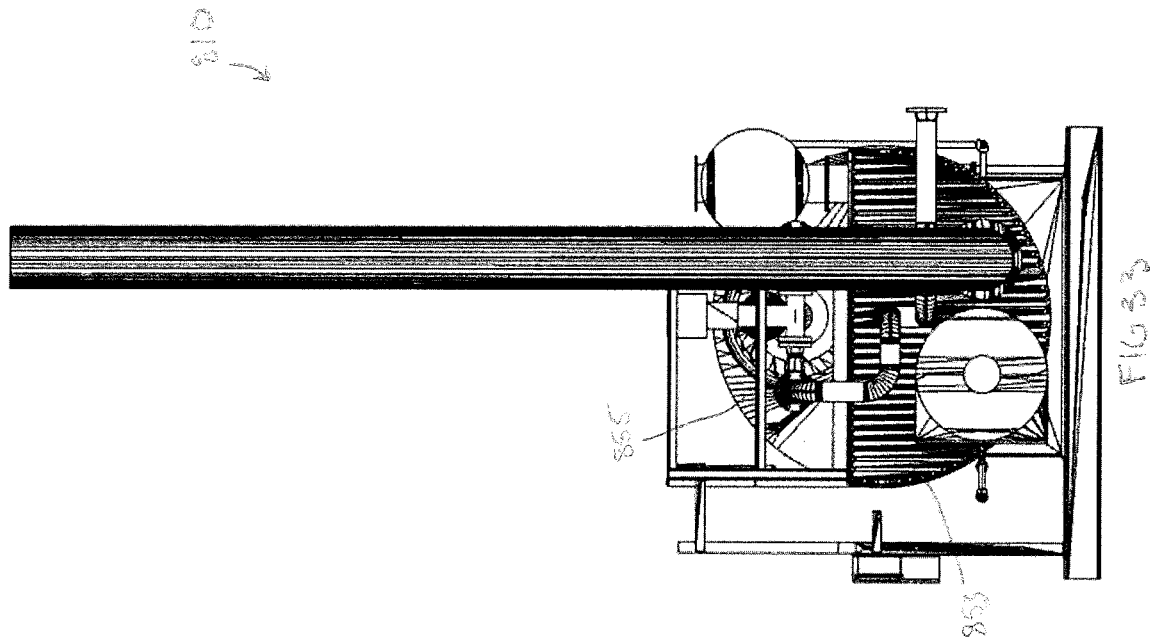
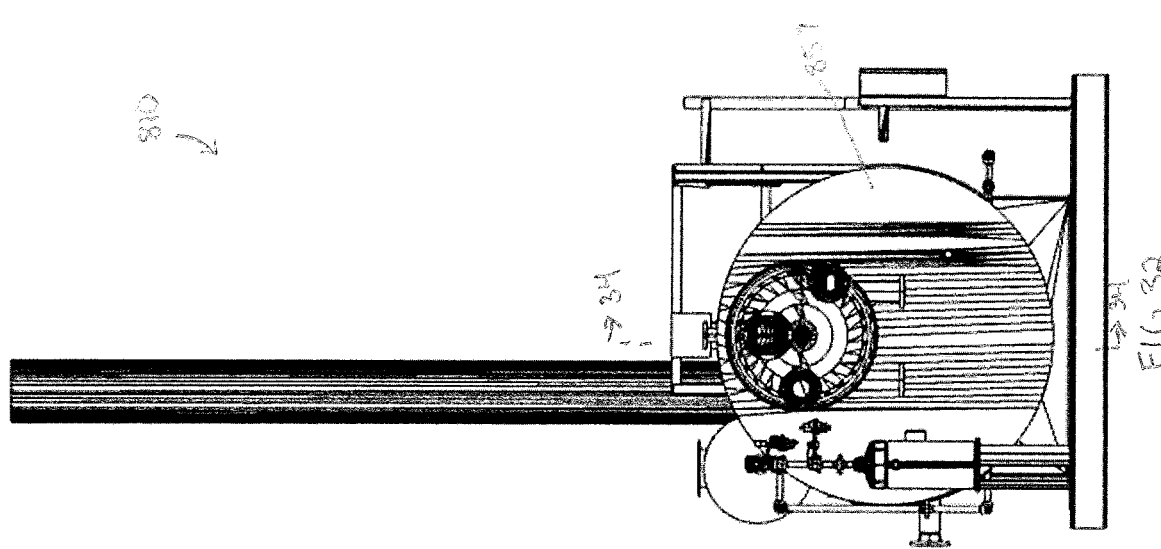

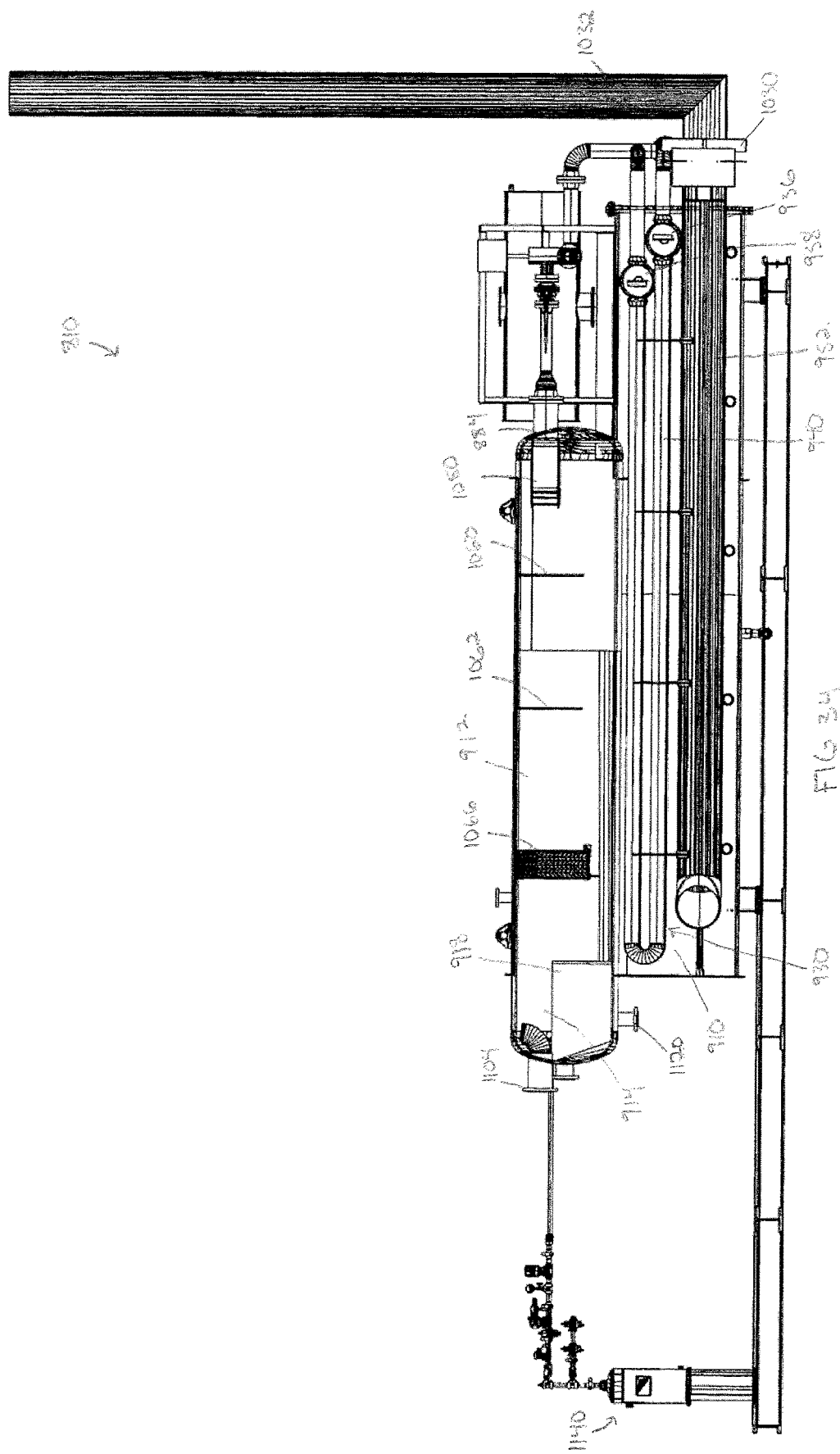

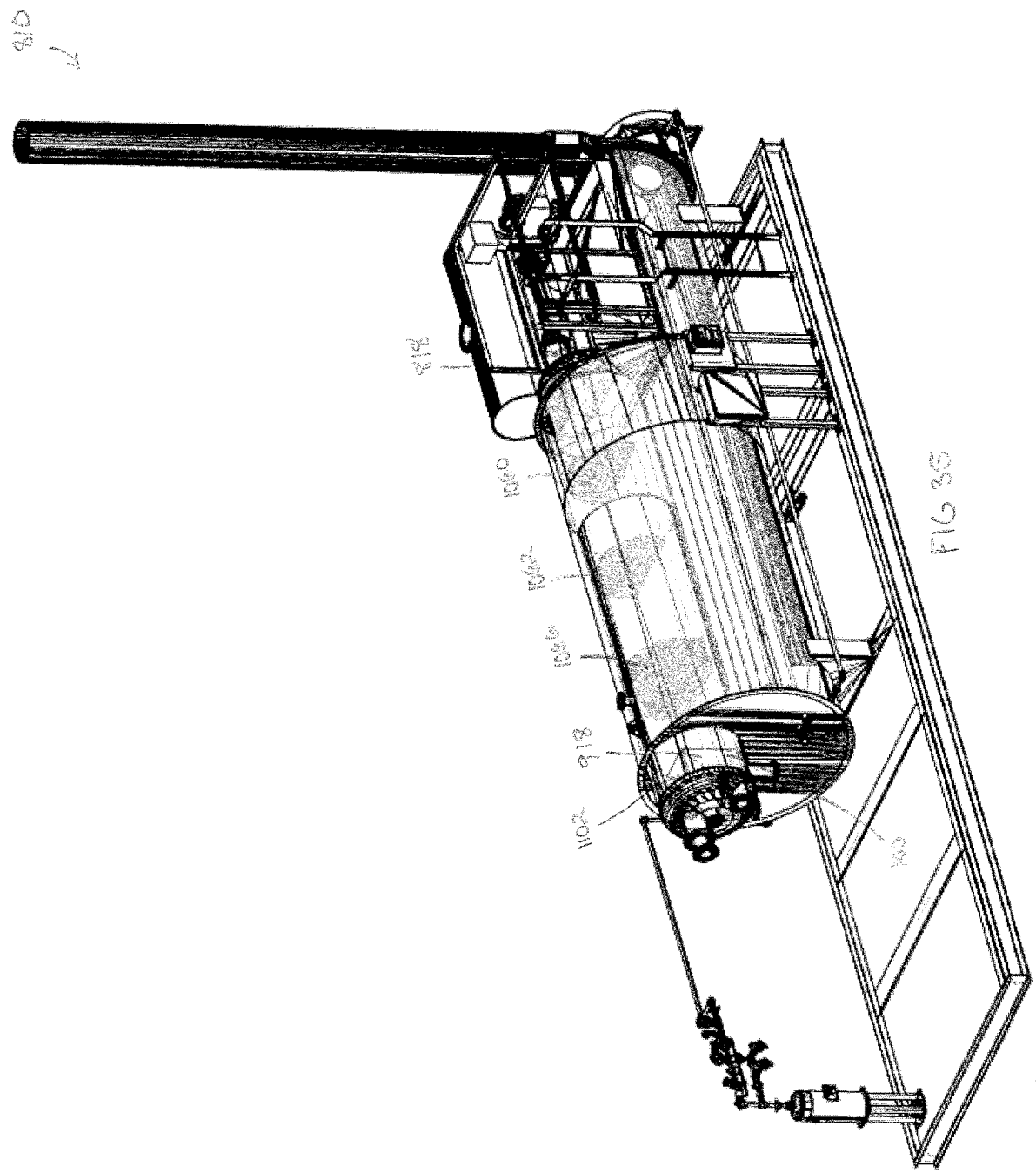

HEATED SEPARATION ASSEMBLY

TECHNICAL FIELD

In general, the present invention relates to a separation assembly, and in particular to an indirect heated separation assembly.

BACKGROUND OF THE INVENTION

The oil and gas industry requires multiphase mixtures to be separated in preparation for downstream processing. Gas produced from an oil or gas well will contain oil and water. Before the gas and crude oil can be refined, the liquids are separated from the gas, and the gas and water are separated from the oil. The separators function to separate a stream into oil, gas, and water components, and then function to separate the gas from the liquids, and the water from the oil. Some separation techniques utilize separation apparatuses positioned within the separator.

SUMMARY OF THE INVENTION

The present application provides an indirect heated separation assembly including a vessel having a heating section and a separation section separated by a plate. The plate is configured to be heated by a heating fluid in the heating section of the vessel to provide indirect heat to the separation section for additional heating of the fluid.

In accordance with an embodiment of the present invention, an assembly is provided that includes a vessel having a heating section and a separation section, a plate separating the heating section from the separation section, the plate being configured to be heated by a heating fluid in the heating section to provide indirect heat to the separation section, and a coil assembly disposed in the heating section, the coil assembly including an inlet configured to receive a process fluid and an outlet in communication with an inlet of the separation section to direct the process fluid after heating to the separation section.

In accordance with an embodiment of the present invention, an assembly is provided that includes a vessel having a heating section, a separation section positioned above the heating section, and a collection section in communication with an outlet of the separation section, a plate forming a top of the heating section and a bottom of the separation section and configured to be heated by a heating fluid in the heating section to provide indirect heat to the separation section, and a coil assembly including an inlet configured to receive a process fluid, an inlet header disposed in the heating section that receives the process fluid from the inlet and separates the process fluid into a plurality of streams, a plurality of coils disposed in the heating section and connected to the inlet header to receive the plurality of streams, an outlet header disposed in the heating section and connected to the plurality of coils to combine the plurality of streams after heating, and an outlet that receives the process fluid from the outlet header and is configured to direct the process fluid to the separation section.

In accordance with an embodiment of the present invention, an assembly is provided that includes a vessel having an interior defining a heating section and a separation section positioned above the heating section, a plate disposed in the vessel forming a top of the heating section and a bottom of the separation section and configured to be heated by a heating fluid in the heating section to provide indirect heat to the separation section, and a heat exchanging assembly at least partially disposed in the heating section, the heat exchanging including an inlet configured to receive a process fluid and an outlet in communication with an inlet of the separation section to direct the process fluid after heating to the separation section.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 1 is a perspective view of an exemplary separation assembly.

FIG. 2 is another perspective view of the separation assembly.

FIG. 3 is a front view of the separation assembly.

FIG. 4 is a rear view of the separation assembly.

FIG. 5 is a top view of the separation assembly.

FIG. 6 is a bottom view of the separation assembly.

FIG. 32 is a front view of the separation assembly.

FIG. 33 is a rear view of the separation assembly.

FIG. 34 is a cross-sectional view taken about line 34-34 in FIG. 32.

FIG. 35 is a perspective view of the separation assembly with a vessel being transparent.

DETAILED DESCRIPTION OF THE INVENTION

Figure 7:
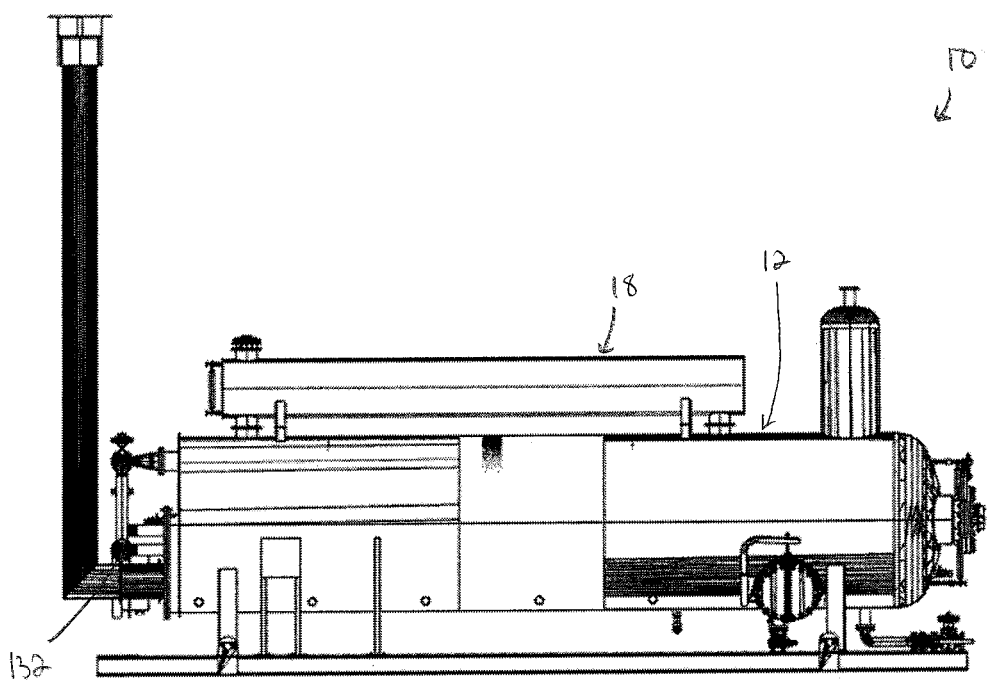
FIG. 7 is a left side view of the separation assembly.
Figure 8:
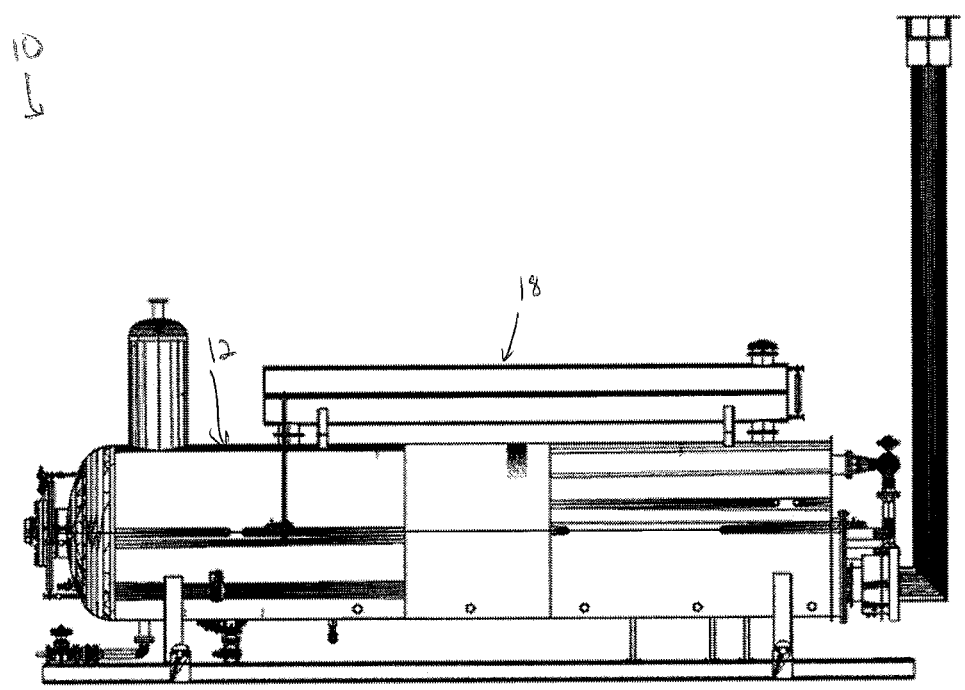
FIG. 8 is a right side view of the separation assembly.

Embodiments of the invention relate to methods and systems that relate an assembly including a vessel having a heating section and a separation section, a plate separating the heating section from the separation section, and a coil assembly disposed in the heating section and configured to be submerged in a heating fluid. The plate is configured to be heated by the heating fluid in the heating section to provide indirect heat to the separation section. The coil assembly includes an inlet configured to receive a process fluid and an outlet in communication with an inlet of the separation section to direct the process fluid to the separation section to be further heated.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning initially to FIGS. 1-8, an indirect heated separation assembly is shown generally at reference numeral 10. The assembly include a vessel 12, a base 14 configured to rest on a surface, legs 16 connected to the base 14 for supporting the vessel 12, and an expansion tank assembly 18. The expansion tank assembly includes a tank 20 positioned above the vessel 12 and supported on the vessel 12 by legs 22, and a pair of conduits 24 and 26 extending from the tank 20 into the vessel 12. The expansion tank assembly also includes a pair of valves 28 and 30 connected to respective ports 32 and 34 at a top and bottom of the tank 20 and connected to one another by conduit 36, and a conduit 38 connecting the tank 20 to an interior of the vessel 12 to allow for sensing of fluid in the vessel 12.

The vessel includes a sidewall 50, which is illustrated as three separate pieces connected together, an end plate 52 at a first end of the sidewall 50, and a head 54 at a second end of the sidewall 50. As illustrated, the sidewall 50 is tubular in shape, the head 54 is dome shaped and connected to the sidewall 50 to close the second end, and the end plate 52 is semicircular in shape and connected to the sidewall 50 to close a portion of the first end. The head 54 includes a tubular portion 56 closed by a cover 58, a tubular portion 60 that receives a liquid level controller 62, a first pair of valves 64 and 66 connected to respective tubular portions 68 and 70 at a top and middle portion of the head 54 and connected to one another by conduit 72, and a second pair of valves 74 and 76 connected to respective tubular portions 78 and 80 at the middle portion and bottom of the head 54 and connected to one another by conduit 82. The end plate 52 includes a tubular portion 84 for connected to a conduit 86 that is connected to a control valve 88, such as a three-way pinch valve. The control valve 88 is also connected to an outlet of a coil assembly and to a conduit 90 in communication with an inlet of the coil assembly. Depending on the desired process outlet temperature, the control valve 88 can be used to bypass the heating section via the conduit 90 or increase/decrease the amount of process fluid being heated in the heating section. The sidewall 50 includes a valve 92 for dumping fluid in the bottom of the vessel 12, a tubular portion 94 that receives a liquid level controller 96, and one or more tubular portions 98 for connection to suitable sensors, for example for sensing the temperature of the heating section for control of the control valve 88.

Referring additionally to FIGS. 9-13, the inside of the vessel 12 is separated into a heating section 110, a separation section 112, which is a heated separation section, and a collection section 114. As shown, the heating section 110 is provided at a bottom of the vessel 12, the separation section 112 is provided above the heating section 110, and the collection section 114 is provided downstream of the separation section 112 proximate the head 54 such that all three sections are in one housing. A plate 116, which is a heat conducting plate, is provided in the vessel 12 separating the heating section 110 from the separation section 114 and a plate 118 is provided in the vessel 12 separating the heating section 110 from the collection section 114. The plate 116 is provided to be heated by a heating fluid, such as a glycol/water mixture, in the heating section 110 to provide indirect heat to the separation section 112, and may have a suitable shape, such as being a flat plate, curved plate, etc. By providing an indirect heated system, the assembly 10 can be located closer to storage tanks than a direct fired system, thereby reducing line losses and size of the assembly. As shown, the plate 116 is extends horizontally in the vessel 12 and the plate 118 extends vertically in the vessel 12. It will be appreciated that the plates 116 and 118 can be formed as one piece or as a plurality of pieces. Attached to the plate 118 facing the collection section 114 are a plurality of spaced gussets 120. The heating section 110 is in fluidic communication with the tank 20 of the expansion tank assembly 18 via the conduits 24 and 26 that extend from the tank 20, through the separation section 112 and the plate 116, and into the heating section 110. The heating fluid is thereby in communication with the expansion tank to account for thermal expansion resulting from the heating of the heating fluid.

Referring additionally to FIGS. 14-18, disposed in the heating section 110 is a coil assembly 130. The coil assembly 130 includes an inlet 132, and outlet 134, an inlet header 136, and outlet header 138, a plurality of coils 140 connected to the inlet and outlet headers 136 and 138 and submerged in the heating fluid, a conduit 142 connecting the inlet 132 to the inlet header 136, a conduit 144 connecting the outlet 134 to the outlet header 138, and an end plate 148. The end plate 148 is at the first end of the sidewall 50, and with the end plate 52 closes off the first end of the vessel, and in particular the heating section 110. The end plate 148 includes a plurality of openings through which components extend, such as an opening through which the conduit 142 extends, an opening through which the conduit 144 extends, an opening for a heater connection 150 of a firetube 152, an opening for an exhaust connection 154 of the firetube 152, and one or more openings for tubular portions 156 to which suitable sensors 158 are attached, and as shown three tubular portions and sensors. The heating section 110 has one end formed by the end plate 148, one end formed by the plate 118, a top formed by the plate 116, and sides and bottom formed by the sidewall 50.

The inlet 132 is configured to receive a process fluid, such as a three phase fluid such as an oil/gas/water mixture and direct the process fluid to the inlet header 136 via conduit 142, and the outlet 134 is configured to receive the heated process fluid from the outlet header 138 via the conduit 144. The outlet 134 is in communication with the tubular portion 84, which serves as an inlet of the separation section 112, via the valve 88 and conduit 86 to direct the heated process fluid to the separation section 112.

Figure 19:
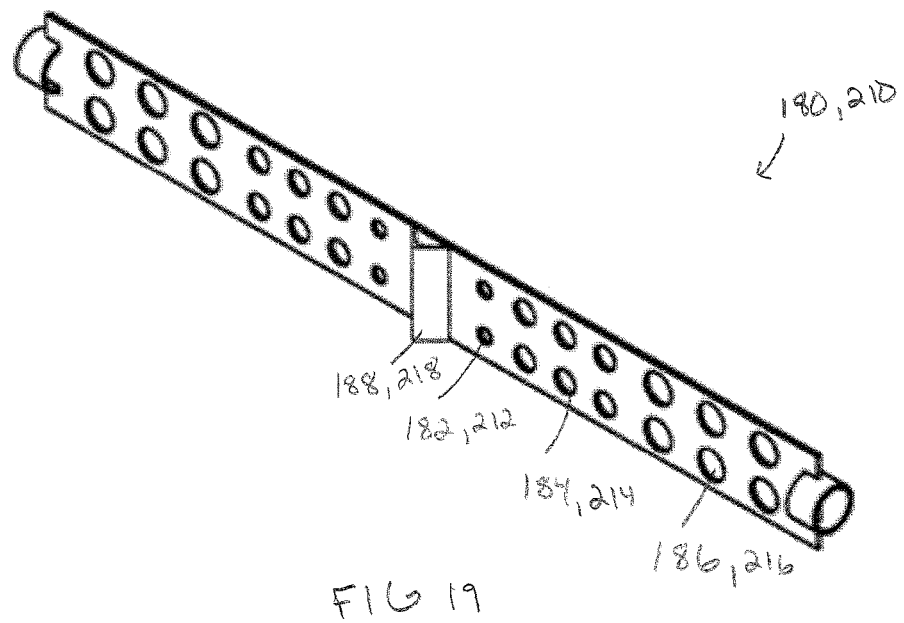
FIG. 19 is a perspective view of a baffle of an inlet diverter of the coil assembly.
Figure 20:
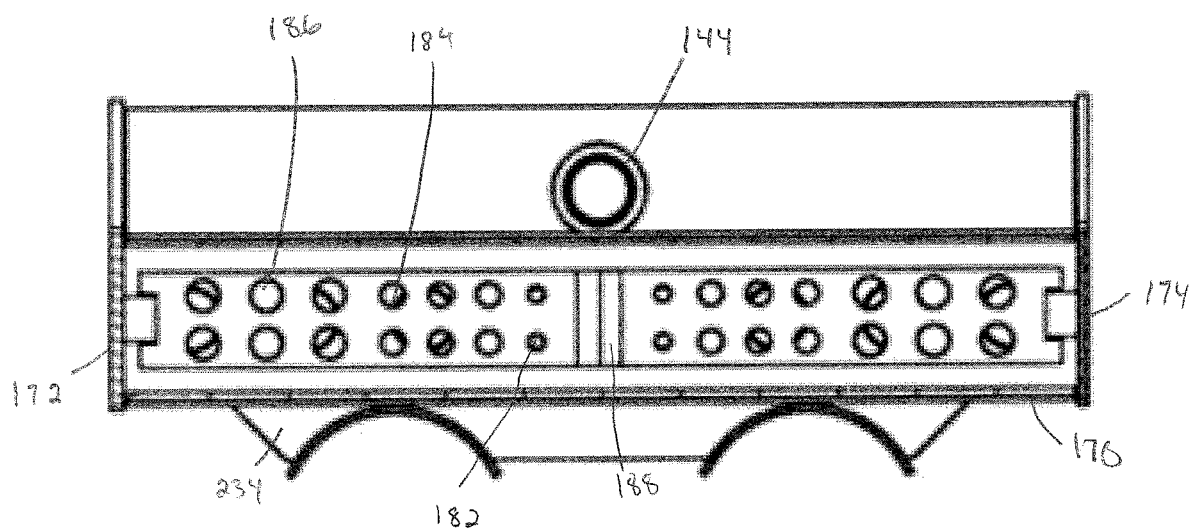
FIG. 20 is a cross-sectional view of the inlet diverter.

Referring additionally to FIGS. 19 and 20, the inlet header 136, which is submerged in the heating fluid, is provided to separate the process fluid into a plurality of streams and includes a substantially tubular body 170 having ends closed by end caps 172 and 174, an inlet 176 at or near a center of the body 170 connected to the conduit 142, and a plurality of outlets 178 connected to the plurality of coils 140. Disposed in the body 170 is a flow distribution baffle 180 for maintaining a constant flow of the process fluid through the flow distribution baffle 180 across a length of the body 170. The flow distribution baffle 180 includes a plurality of openings 182, 184, and 186 through which the process fluid is separated into a plurality of streams to enter the plurality of coils 140. To maintain the constant flow, the diameter of the openings 182 proximate the central portion of the baffle 180 are smaller in diameter than the openings 186 proximate the ends of the baffle 180 at the end caps 172 and 174. In an embodiment, the diameter of the openings 184, which are provided between the openings 182 and 186, is larger than the diameter of the openings 182 and smaller than the diameter of the openings 186. The baffle 180 may also include a flow direction guide 188 at the central portion of the baffle 180.

The outlet header 138, which is submerged in the heating fluid, is provided to combine the plurality of streams after heating and deliver them to the separation section. The outlet header includes a substantially tubular body 200 having ends closed by end caps 202 and 204, a plurality of inlets 206 connected to the plurality of coils 140, and an outlet 208 at or near a center of the body 200 connected to the conduit 144. Disposed in the body 200 is a flow distribution baffle 210 for maintaining a constant flow of the process fluid through the flow distribution baffle 210 across a length of the body 210. The distribution baffle 210 is substantially the same as the distribution baffle 180 and thus also shown in FIG. 19. The flow distribution baffle 210 includes a plurality of openings 212, 214, and 216 through which the separated and heated process fluid flows from the plurality of coils 140 to the outlet 208. To maintain the constant flow, the diameter of the openings 212 proximate the central portion of the baffle 2100 are smaller in diameter than the openings 216 proximate the ends of the baffle 210 at the end caps 202 and 204. In an embodiment, the diameter of the openings 214, which are provided between the openings 212 and 216, is larger than the diameter of the openings 212 and smaller than the diameter of the openings 216. The baffle 210 may also include a flow direction guide 218 at the central portion of the baffle 180.

Figure 18:
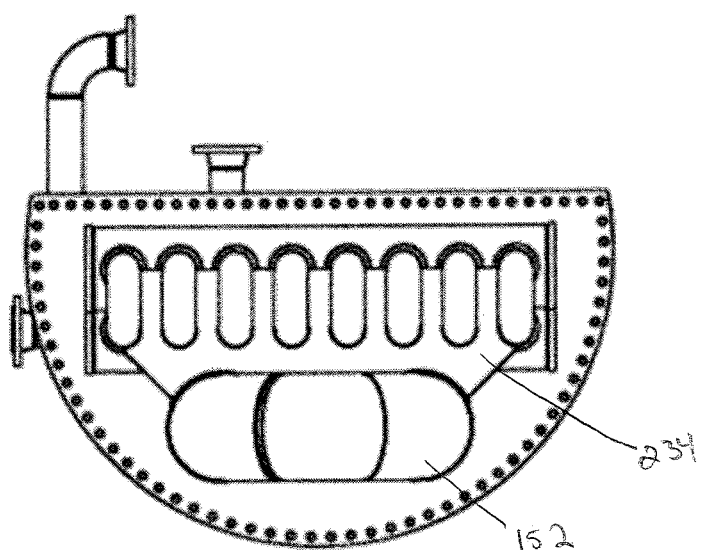
FIG. 18 is a rear view of the coil assembly.

The coil assembly 130 additionally includes the firetube 152 having the heater connection 150 for connection to a heat source, such as burner 230, and an exhaust connection 154 for connection to an exhaust stack 232. The firetube 152 is positioned below the plurality of coils 140 submerged in the heating fluid to heat the heating fluid. The plurality of coils 140 are supported by one or more spaced support members 234 having cutouts that rest on tops of the firetube 152, openings through which the plurality of coils 140 extend, and cutouts that the plurality of coils 140 rest upon as best shown in FIG. 18.

Referring again to FIGS. 9-13, the separation section 112 receives the heated process fluid at the inlet 84 from the conduit 90 if fluid is diverted by the valve 88 or from the conduit 144 if fluid is received from the heating section 110. Connected to the inlet 84 is an inlet diverter 250 that directs the process fluid back towards the end plate 52 to reduce the flow rate of the process fluid and to increase the liquid droplet residence time. The inlet diverter 250 includes a top plate 252, a bottom plate 254, and a vane assembly 256 therebetween having a plurality of vanes positioned beside each other, such as in a nested arrangement. The inlet diverter 250 may be a suitable inlet diverter, such as the inlet diverter disclosed in U.S. Pat. No. 9,643,105 issued May 9, 2017, which is hereby incorporated herein by reference.

Disposed in the separation section 112 is a first separation baffle 260 proximate the inlet diverter 250, a second separation baffle 262 proximate an outlet area 264 of the separation section 112, and a vane section 266 disposed therebetween. The first separation baffle 260, second separation baffle 262, and the vane section 266 have bottom surfaces that abut a top of the plate 116 are have a semicircular shape to match the geometry of the vessel 12. In this way, the first separation baffle 260, second separation baffle 262, and the vane section 266 prevent fluid from bypassing the first separation baffle 260, second separation baffle 262, and the vane section 266 and provide structural support to the vessel 12. It will be appreciated however, that other suitable geometries may be used the first separation baffle 260, second separation baffle 262, the vane section 266 and the vessel 12.

Figure 21:
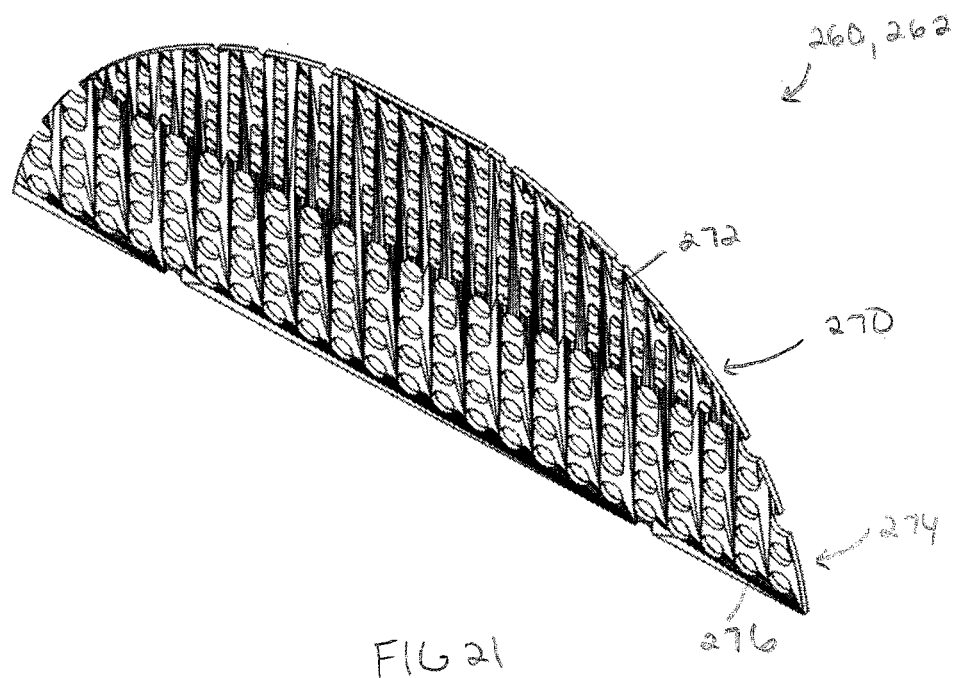
FIG. 21 is a perspective view of a separation baffle.
Figure 22:
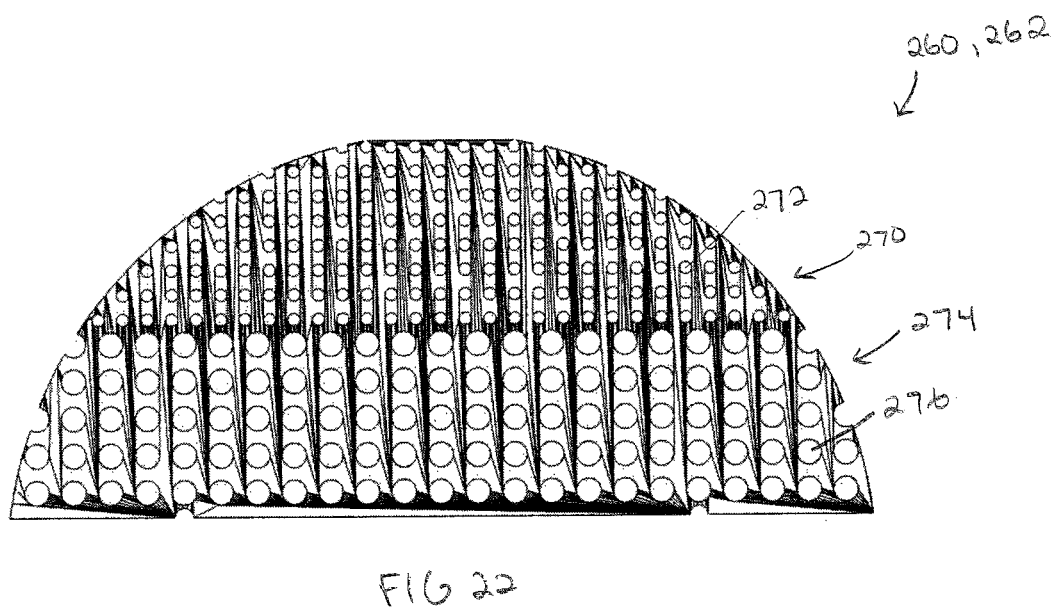
FIG. 22 is a front view of the separation baffle.

Turning now to FIGS. 21 and 22, the first and second separation baffles 260 and 262, which are the same, are illustrated. Each of the first and second separation baffles 260 and 262 include a gas separation section 270 including a plurality of gas openings 272 extending through the respective baffle 260, 262, and a liquid separation section 274 below the gas separation section 270 including a plurality of liquid openings 276 extending through the respective baffle 260, 262. As shown, the plurality of gas openings 272 each have smaller diameters than the plurality of liquid openings 274. The gas separation section 270 of each baffle 260 and 262 serves to separate liquid from the gas flowing through the respective baffle 260 and 262, and the liquid separation section 274 serves to separate water from the oil flowing through the respective baffle 260 and 260

Figure 23:
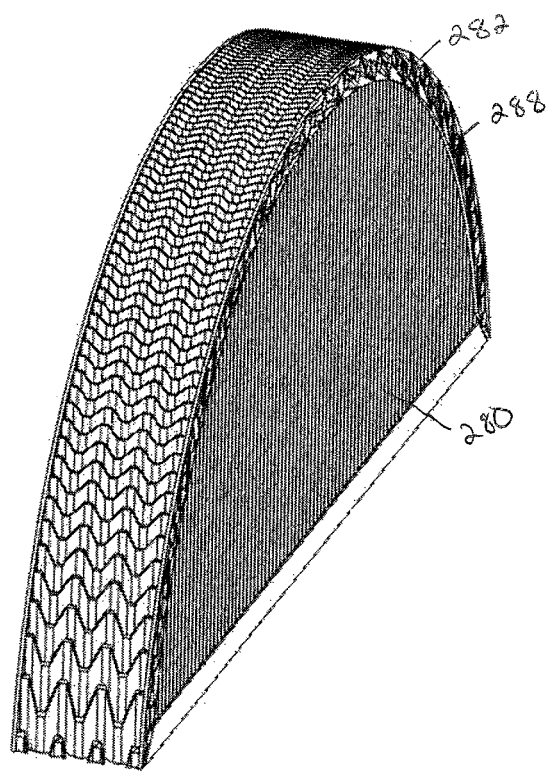
FIG. 23 is a perspective view of a vane section.
Figure 24:
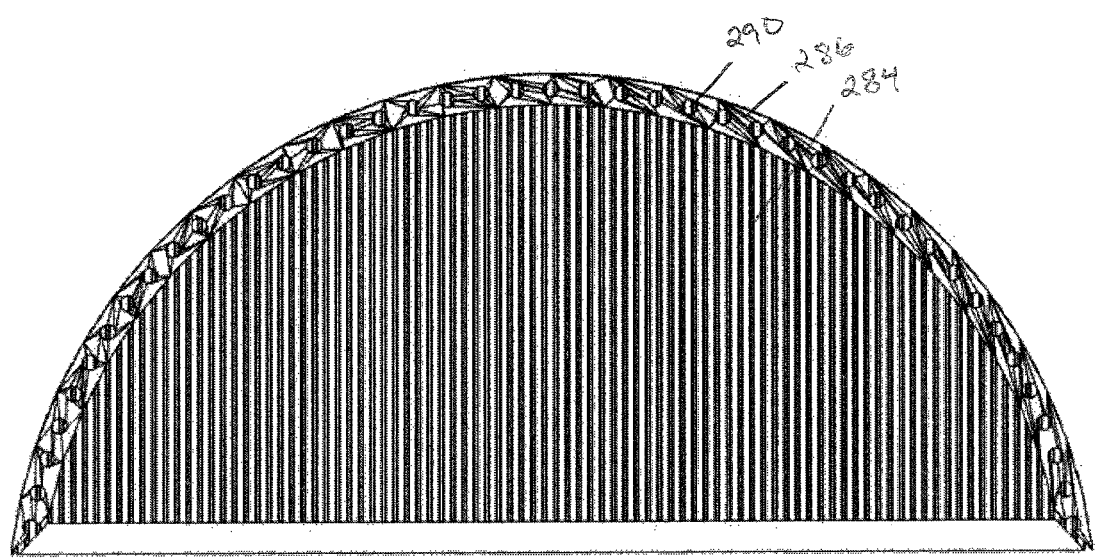
FIG. 24 is a front view of the vane section.
Figure 25:
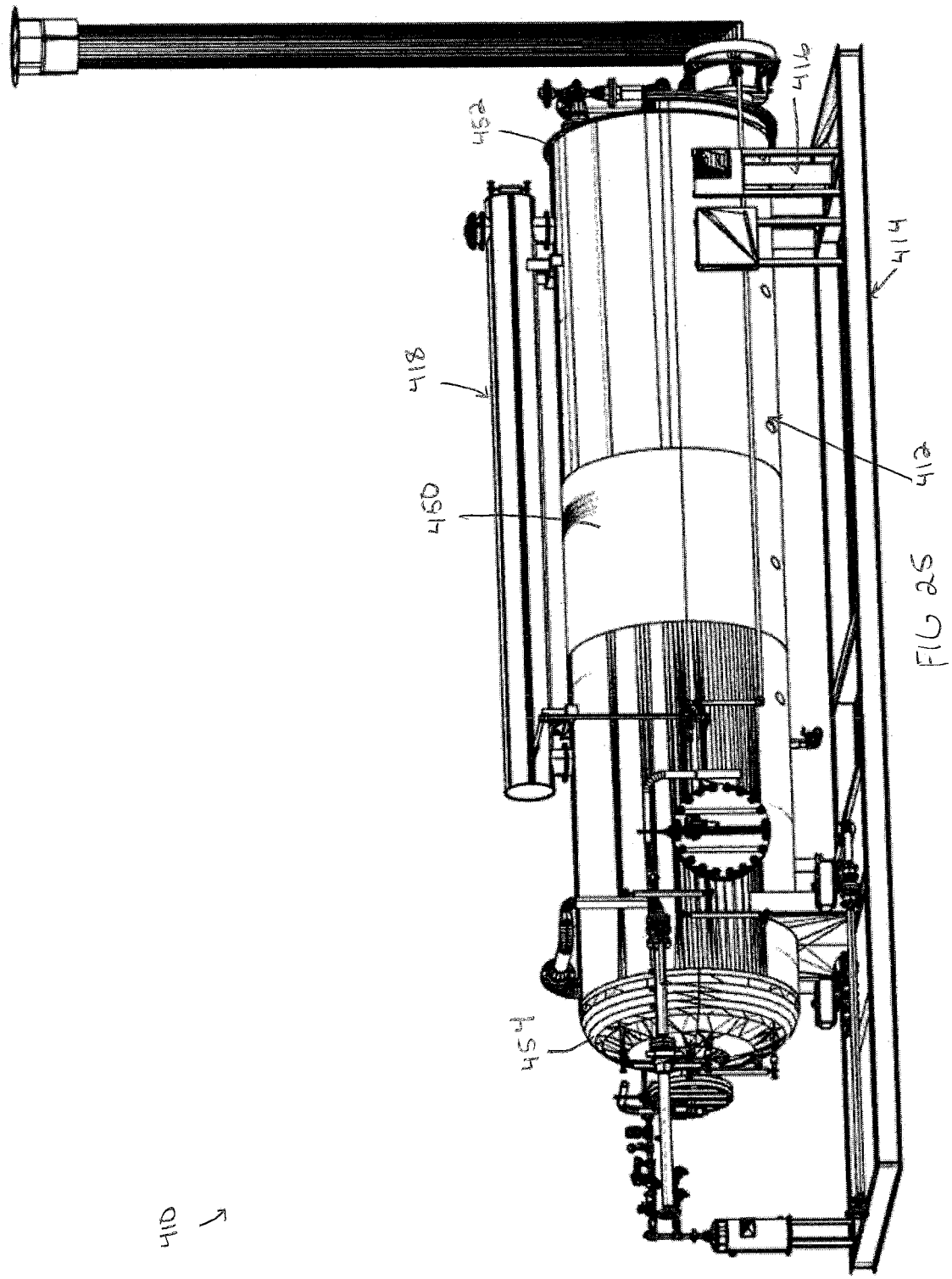
FIG. 25 is a perspective view of another exemplary separation assembly.
Figure 26:
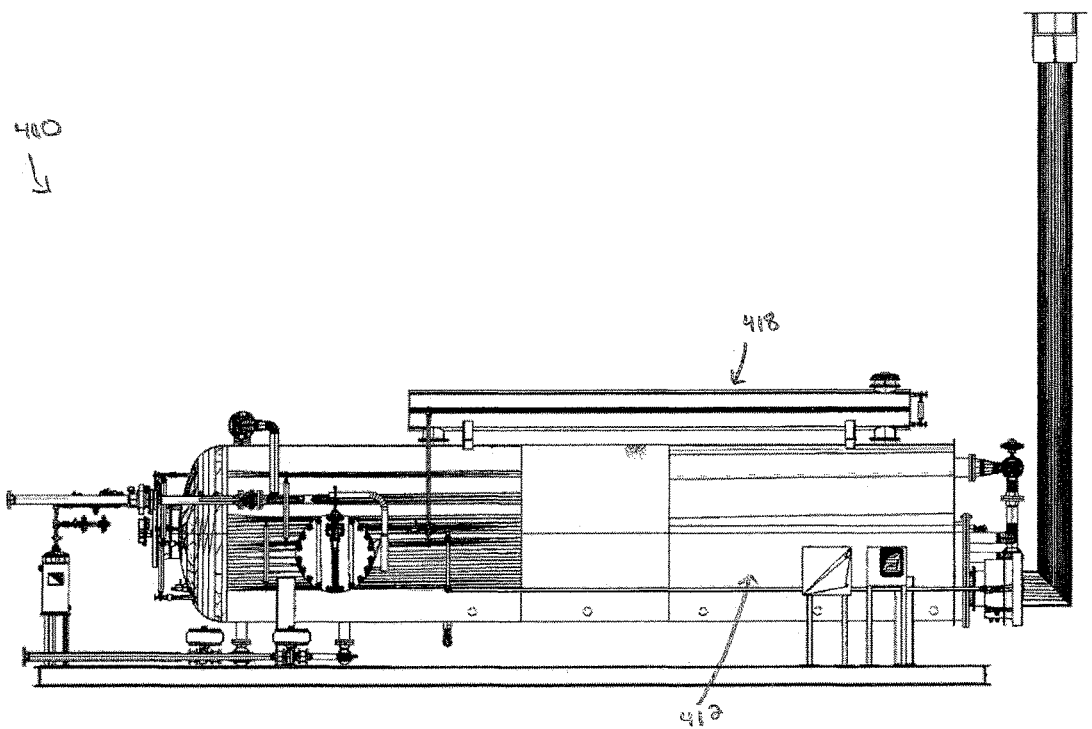
FIG. 26 is a right side view of the separation assembly.
Figure 27:
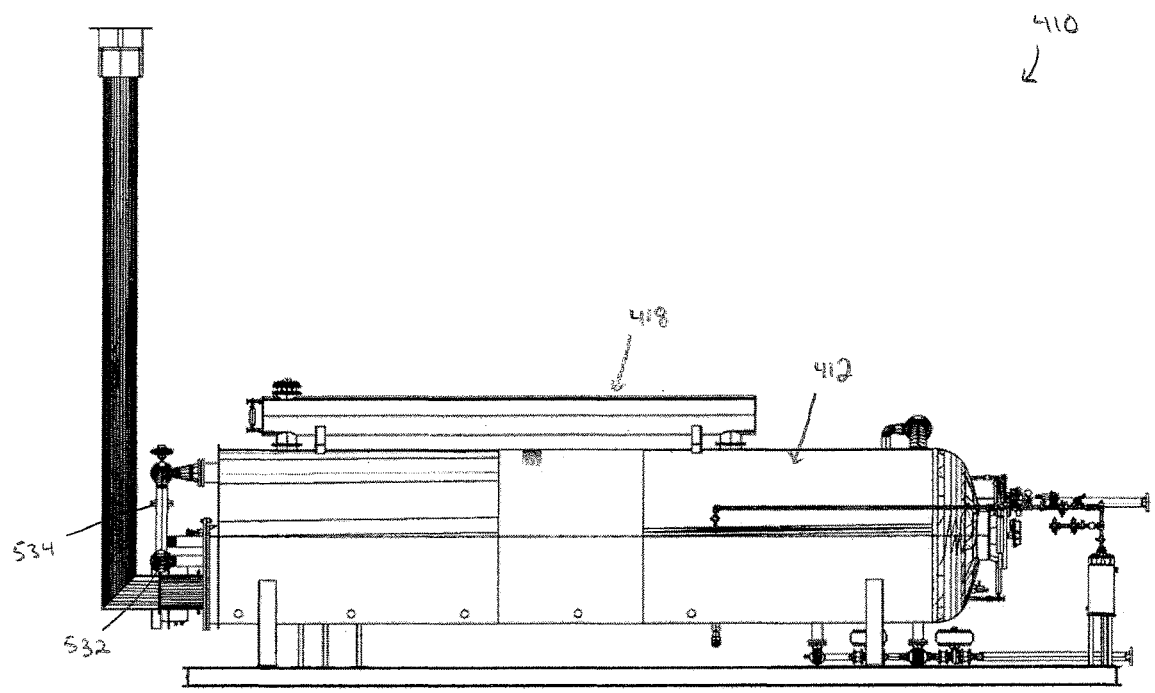
FIG. 27 is a left side view of the separation assembly.

Turning now to FIGS. 23 and 24, the vane section 266 includes an upstream face 280 having a frame 282 extending around a periphery thereof and a downstream face 284 having a frame 286 extending around a periphery thereof. Each frame 282 and 286 includes a plurality of openings 288, 290 respectively that extend therethrough to allow gas and oil to flow through the upstream and downstream faces 280 and 284 at the frames 282 and 286 to increase the available area for fluid to flow. The vane section 266 also includes a gas separation section 292 being vertically aligned with the gas separation sections 270 of the first and second separation baffles 260 and 262, and a liquid separation section 294 below the gas separation section 292 and vertically aligned with the liquid separation section 274. The gas separation section 292 serves as a demister for separating liquid from the gas flowing through the vane section 266 such that the liquid drops into the liquid separation section 294, and the liquid separation section 294 serves as a coalescing device for separating water from the oil flowing through the vane section 266. The vane section 266 is provided with a plurality of thin plate-like structures or lamellae that are fitted parallel, in modular form, and very close to one another, with open spaces between adjacent lamellae.

Referring again to FIGS. 9-13, the collection section 114 is in communication with the outlet area 264 of the separation section 112 to receive the separated water, oil, and gas from the separation section. The collection section 114 includes a water collection section 300 adjacent the outlet area 264, an oil collection section 302 adjacent the water collection section 300 at the second end of the vessel 12, and a gas outlet 304 at a top of the vessel 12.

The water collection section 300 has one end formed by the plate 118 and one end formed by a weir plate 306, and the sides are formed by the sidewall 50 of the vessel 12. Provided at the bottom of the vessel 12 is a conduit 308 connected to a valve 310, such as a pressure control valve. The liquid level controller 96 extends through the sidewall 50 at the water collection section 300. When the liquid level controller 96 senses the water in the water collection section 300 at or above a predetermined height, the valve 310 will be opened allowing a portion or all of the water to exit the water collection section 300 via the conduit 308. Also provided to access the water collection section 300 is a tubular portion 312 closed by a cover 314, which is secured in a suitable manner, such as by suitable fasteners.

Figure 9:
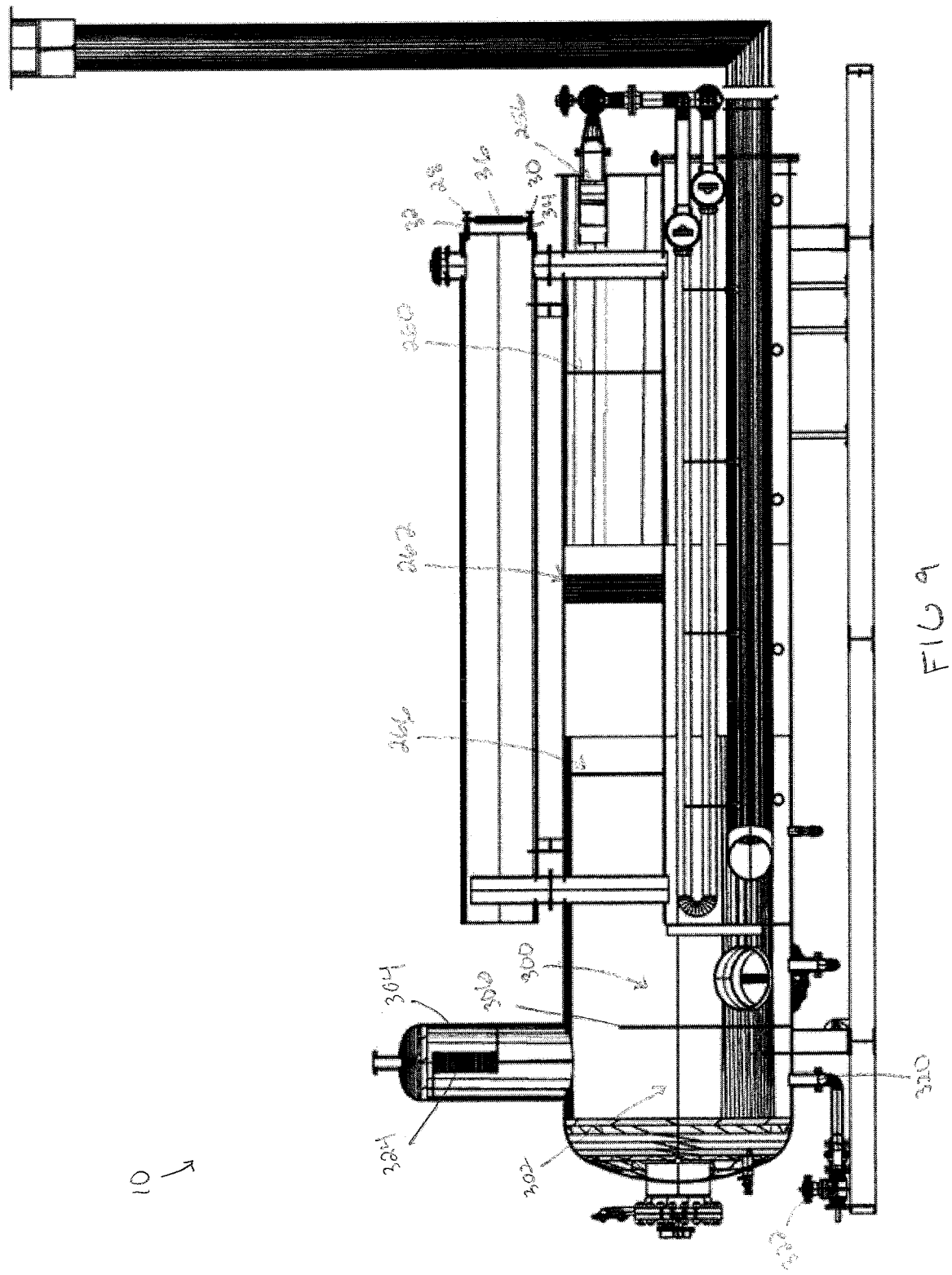
FIG. 9 is a cross-sectional view taken about line 9-9 in FIG. 5.
Figure 10:
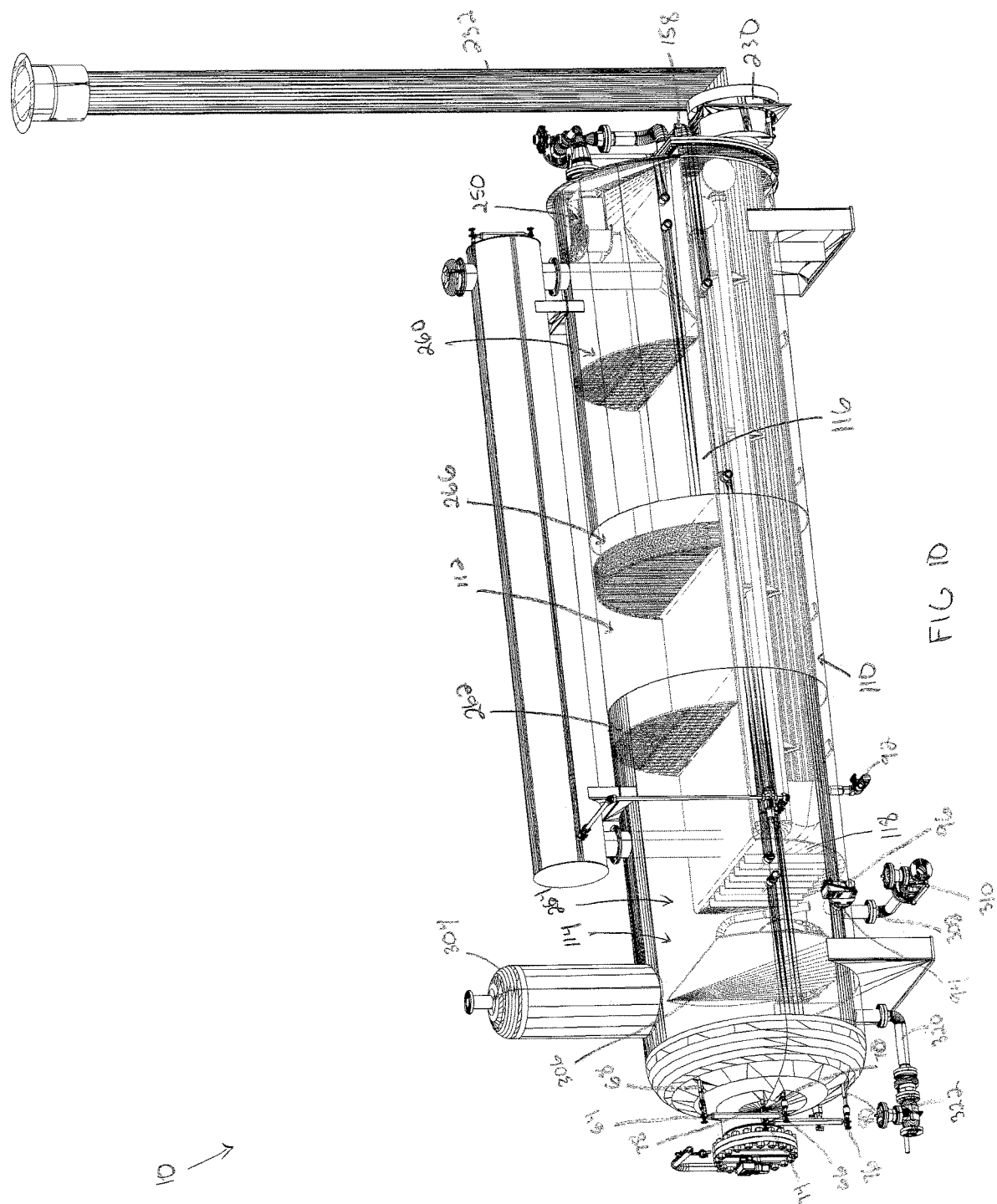
FIG. 10 is a perspective view of the separation assembly with a vessel being transparent.
Figure 11:
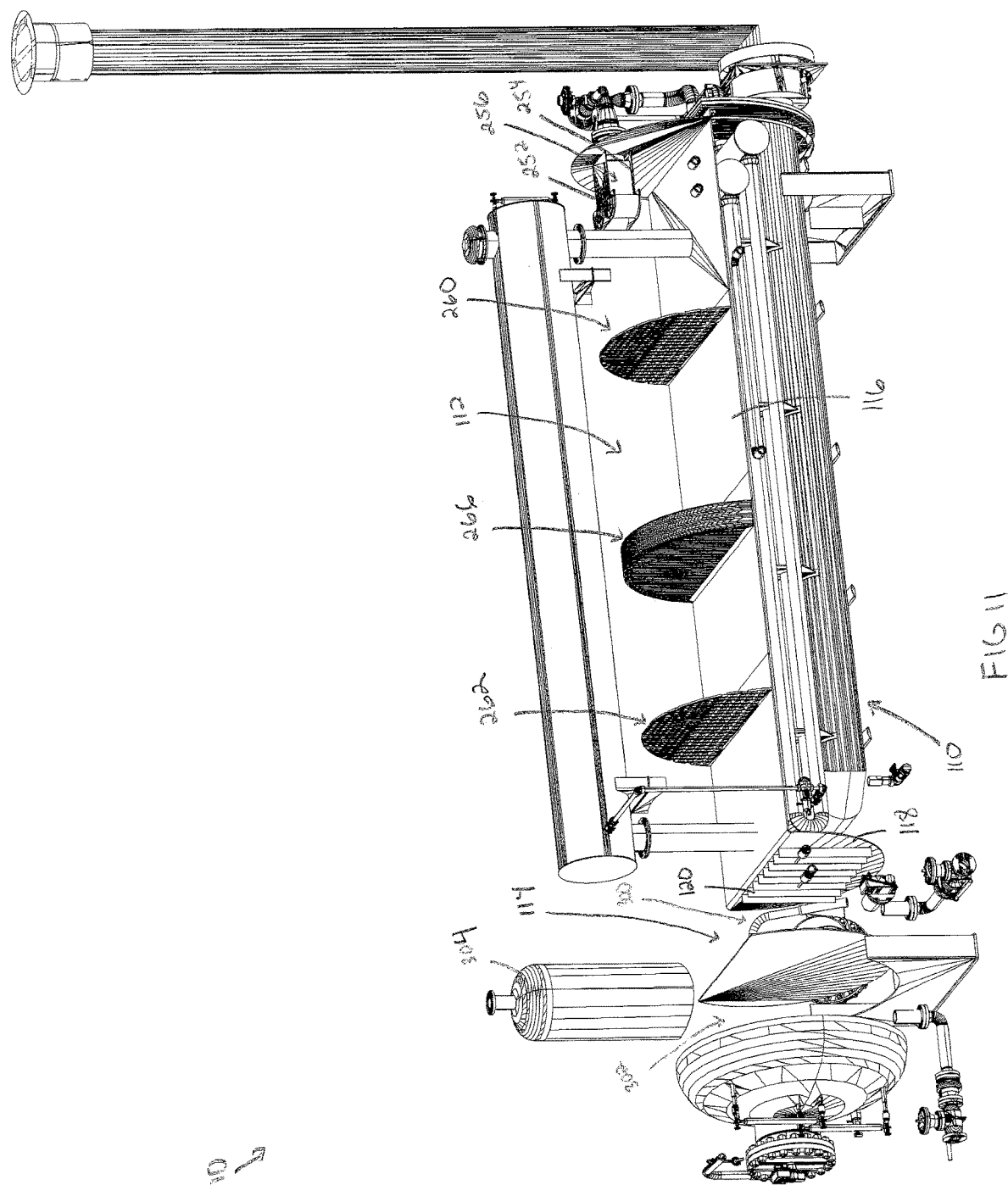
FIG. 11 is a perspective view of the separation assembly with the vessel not shown.
Figure 12:
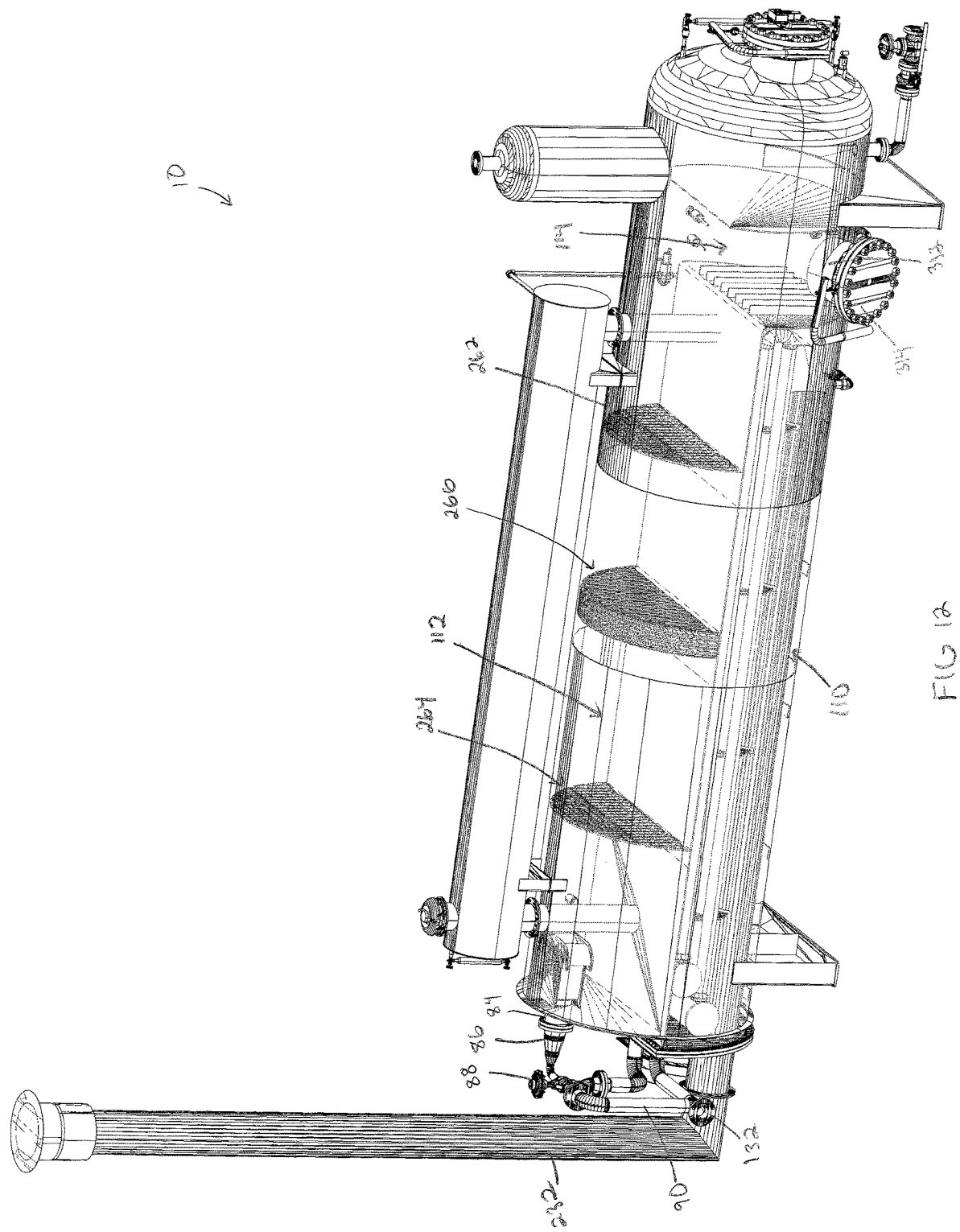
FIG. 12 is another perspective view of the separation assembly with the vessel being transparent.
Figure 13:
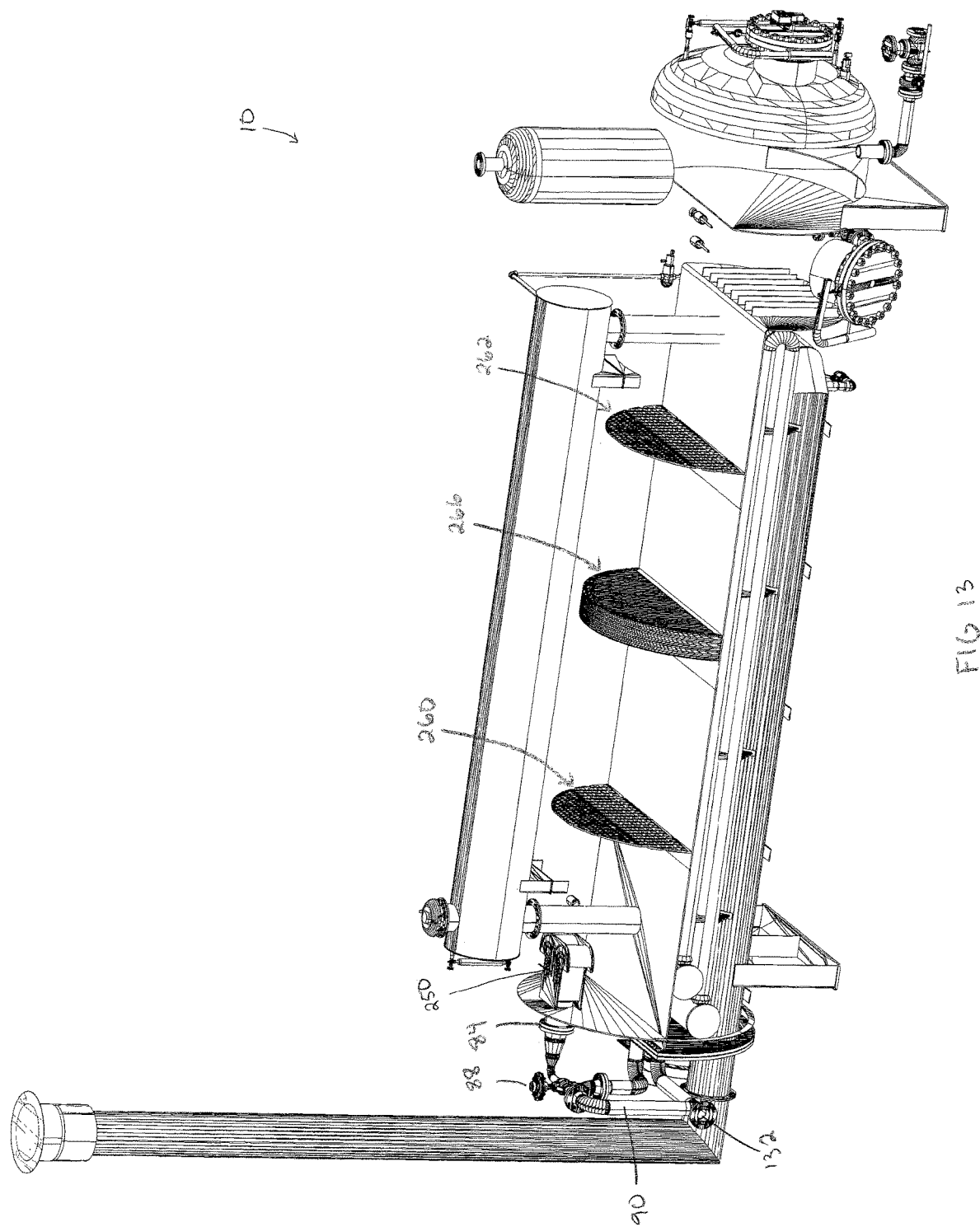
FIG. 13 is another perspective view of the separation assembly with the vessel not shown.
Figure 14:
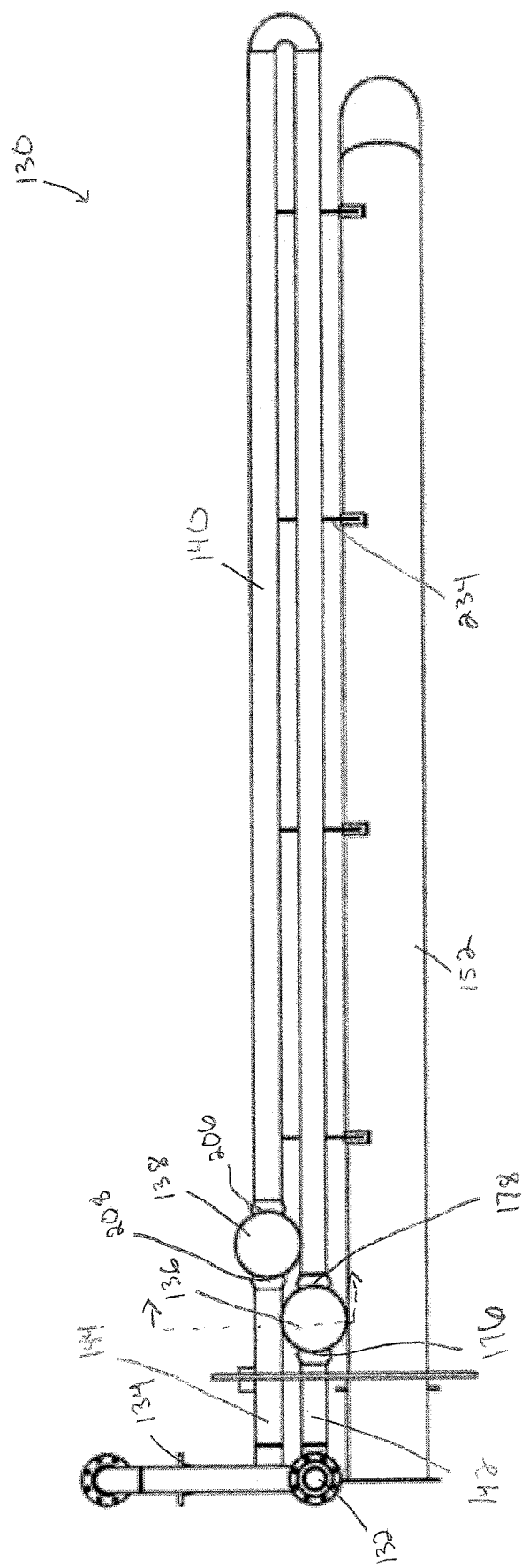
FIG. 14 is a side view of a coil assembly.
Figure 15:
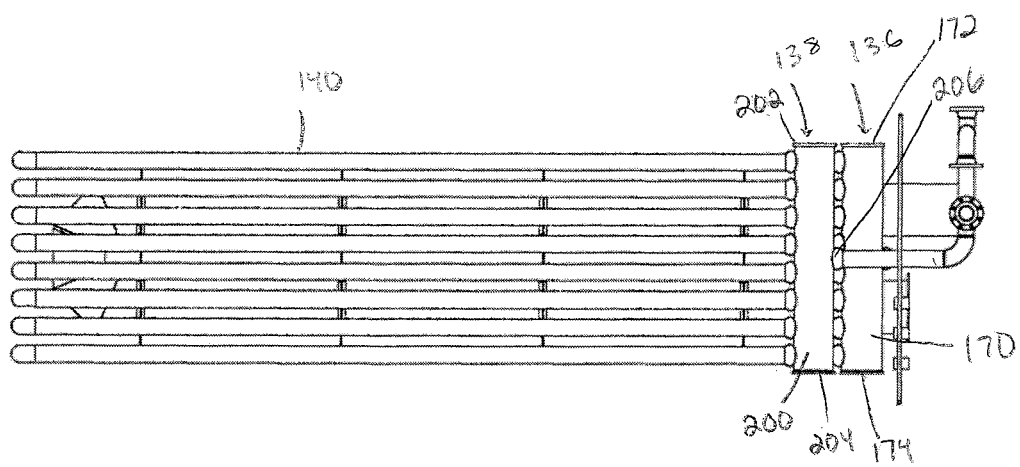
FIG. 15 is a top view of the coil assembly.
Figure 16:
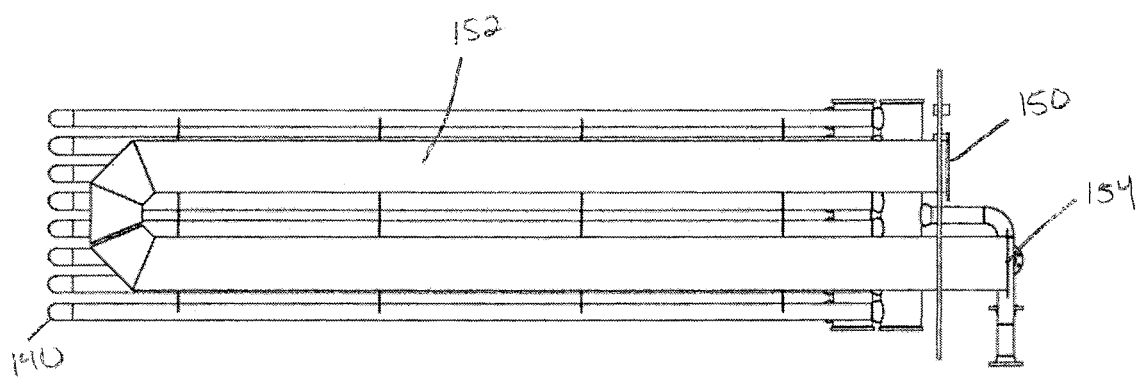
FIG. 16 is a bottom view of the coil assembly.
Figure 17:
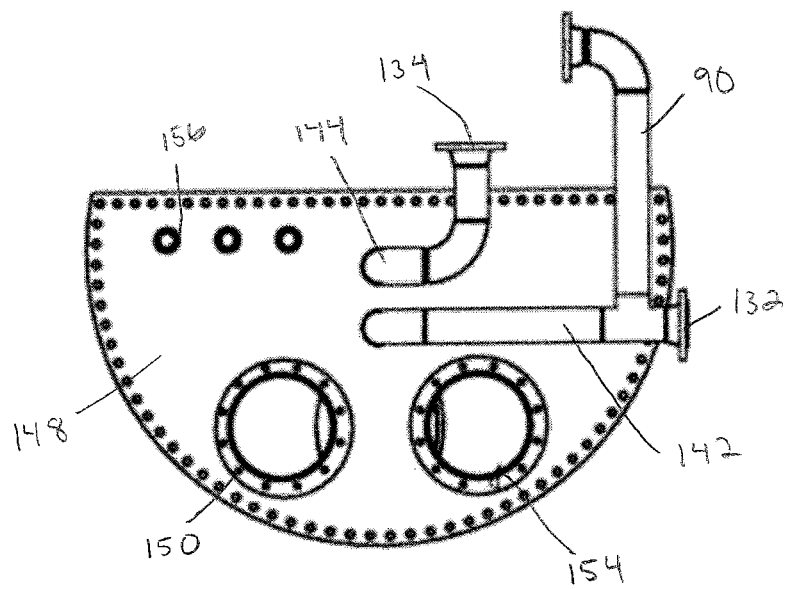
FIG. 17 is a front view of the coil assembly.

The weir plate 306 is secured to the inner surface of the vessel 12. The weir plate has a substantially circular geometry matching the geometry of the vessel 12 such that the sides and bottom of the weir plate 306 abut the sides and bottom of the vessel 12 to prevent fluid from flowing around the weir plate 306. A top of the weir plate is flat providing an area for the oil to flow from the water collection area 300 to the oil collection area 302. As shown in FIG. 9, the top of the weir plate is vertically aligned with a top of the liquid separation section 274 of the first and second separation baffles 260 and 262 and with a top of the liquid separation section 294 of the vane section 266.

The oil collection section 302 has one end formed by the weir plate 306 and one end formed by the head 54, and the sides are formed by the sidewall 50 of the vessel 12. Provided at the bottom of the vessel 12 is a conduit 320 connected to a valve 322, such as a pressure control valve. The liquid level controller 62 extends through the head 54 at the oil collection section 302. When the liquid level controller 62 senses the oil in the oil collection section 302 at or above a predetermined height, the valve 322 will be opened allowing a portion or all of the oil to exit the oil collection section 302 via the conduit 320. Prior to entering the oil collection section 302, the oil sits atop the water in the water collection section 300. When the level in the water collection section reaches the top of the weir plate, the oil spills over into the oil collection section 302.

The gas outlet 304 is provided at the top of the vessel 12 above the oil collection section 302. The gas that exits the gas the gas separation section 270 of the second separation baffle 262 exits the outlet area 264 and flows to the gas outlet 304, where the gas flows through a vertical cross flow vane 324 shown in FIG. 9.

Turning now to the operation of the indirect heated separation assembly 10, the inlet 132 is connected to a conduit to receive the process fluid, such as a three-phase fluid, such as water/oil/gas. In an embodiment, the inlet may be downstream of a separator that minimizes the amount of water in the mixture. The fluid received at the inlet 132 is directed to the conduit 90 if the temperature of the fluid is at or above a predetermined value, or directed to the conduit 142 if the temperature is below a predetermined value. If the fluid is directed to the conduit 142, the fluid flows into the heating section 110, where the fluid is heated by the heating fluid in the heating section 110, which is heated via the firetube 152. The fluid flows to the inlet 176 of the inlet header 136 and through the distribution baffle 180, which separates the fluid into a plurality of streams. The plurality of streams then flow to the plurality of outlets 178 and into the plurality of coils 140 to be heated. The heated fluid exits the plurality of coils 140 and enters the outlet header 138 via the plurality of inlets 206. The fluid then flows through the distribution baffle 210 and into outlet 208 of the outlet header 138. The fluid then flows to the outlet 134 of the coil assembly 130 via the conduit 144 thereby exiting the heating section 110. The fluid then flows through the valve 88, where it can optionally mix with fluid in the conduit 90 and then flow through the conduit 86 to the inlet 84 of the separation section 112.

The heated fluid flows from the inlet 84 into the separation section 112, which is heated via the plate 116 that forms the top of the heating section 110 and the bottom of the separation section 112. The fluid enters the separation section 112 via the inlet diverter 250, which directs the process fluid back towards the end plate 52 to reduce the flow rate of the heated fluid and to increase the liquid droplet residence time. The fluid then flows through the first separation baffle 260, where the gas/fluid flows through the gas separation section 270 and the water/oil flows through the liquid separation section 274. The gas separation section 270 of the first separation baffle 260 separates at least some of the liquid from the gas flowing therethrough and the liquid separation section 274 separates at least some of the water from the oil flowing therethrough.

The fluid then flows to the vane section 266, where the gas flows through the gas separation section 292 and the water/oil flows through the liquid separation section 294. The gas separation section 292 serves as a demister for removing liquid from the gas flowing through the vane section 266 and the liquid separation section 294 serves as a coalescing device for removing water from the oil flowing through the vane section 266. The fluid then flows through the second separation baffle 262, where the gas flows through the gas separation section 270 and the water/oil flows through the liquid separation section 274. The gas separation section 270 of the first separation baffle 260 separates any remaining liquid from the gas flowing therethrough and the liquid separation section 274 separates any remaining water from the oil flowing therethrough.

The separated fluid then exits the separation section 112 via the outlet area 264. The water and oil enter the water collection area 300, where the oil sits on the water and spills over into the oil collection area 302 if the level of oil rises above the top of the weir plate 306, and the gas flows to the gas outlet 304. The water and oil can then be dumped from the system if respective liquid level controllers 96 and 62 sense the levels of the water and oil to be above a predetermined height.

Turning now to FIGS. 25-28, an exemplary embodiment of the indirect heated separation assembly is shown at 410. The indirect heated separation assembly 410 is substantially the same as the above-referenced indirect heated separation assembly 10, and consequently the same reference numerals but indexed by 400 are used to denote structures corresponding to similar structures in the indirect heated separation assemblies. In addition, the foregoing description of the indirect heated separation assembly 10 is equally applicable to the indirect heated separation assembly 410 except as noted below and illustrated in the figures.

The indirect heated separation assembly 410 includes a vessel 412, a base 414 configured to rest on a surface, legs 416 connected to the base 414 for supporting the vessel 412, and an expansion tank assembly 418. The vessel includes a sidewall 450, which is illustrated as three separate pieces connected together, an end plate 452 at a first end of the sidewall 450, and a head 454 at a second end of the sidewall 450.

Figure 28:
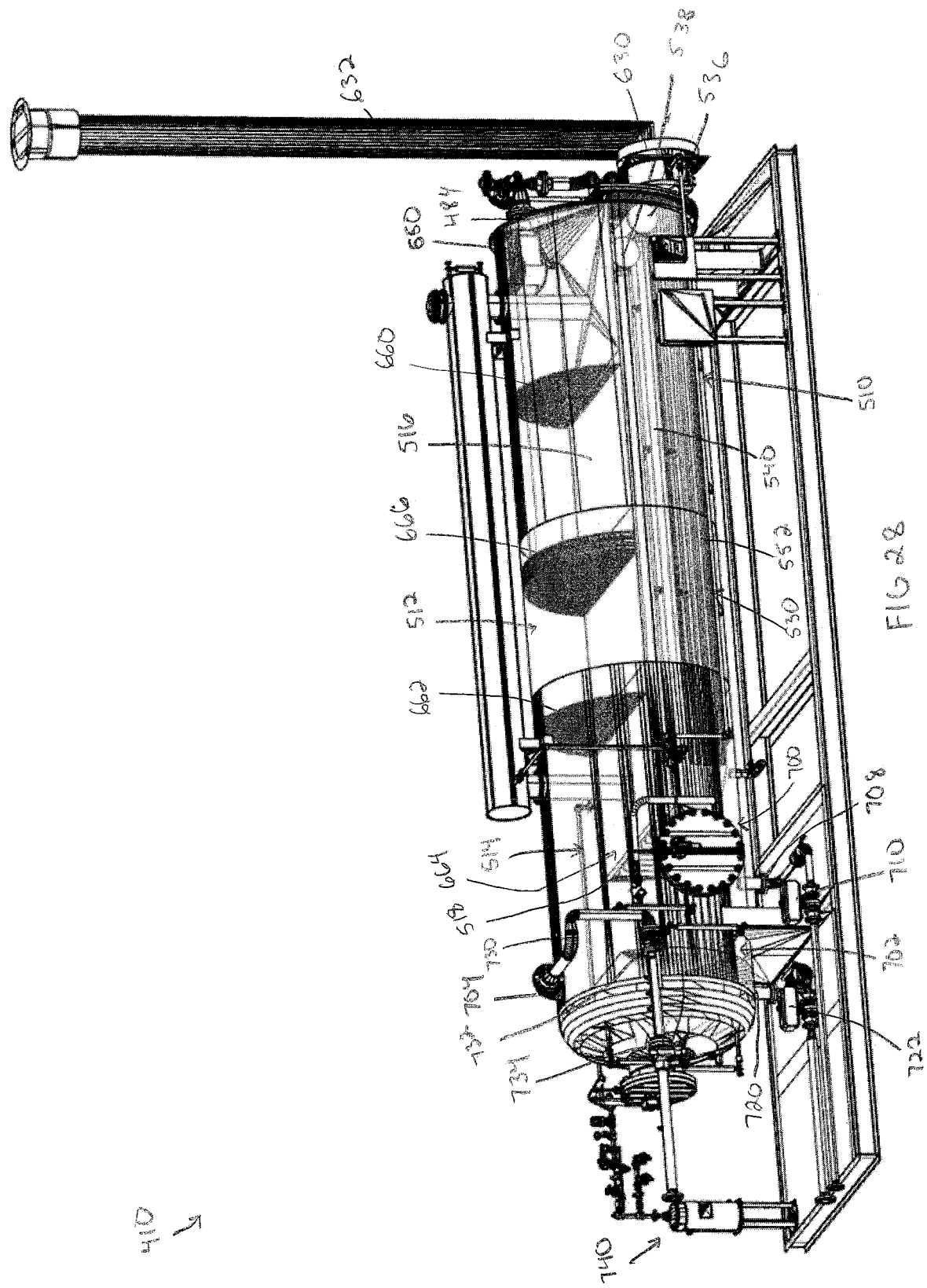
FIG. 28 is a perspective view of the separation assembly with a vessel being transparent.
Figure 29:
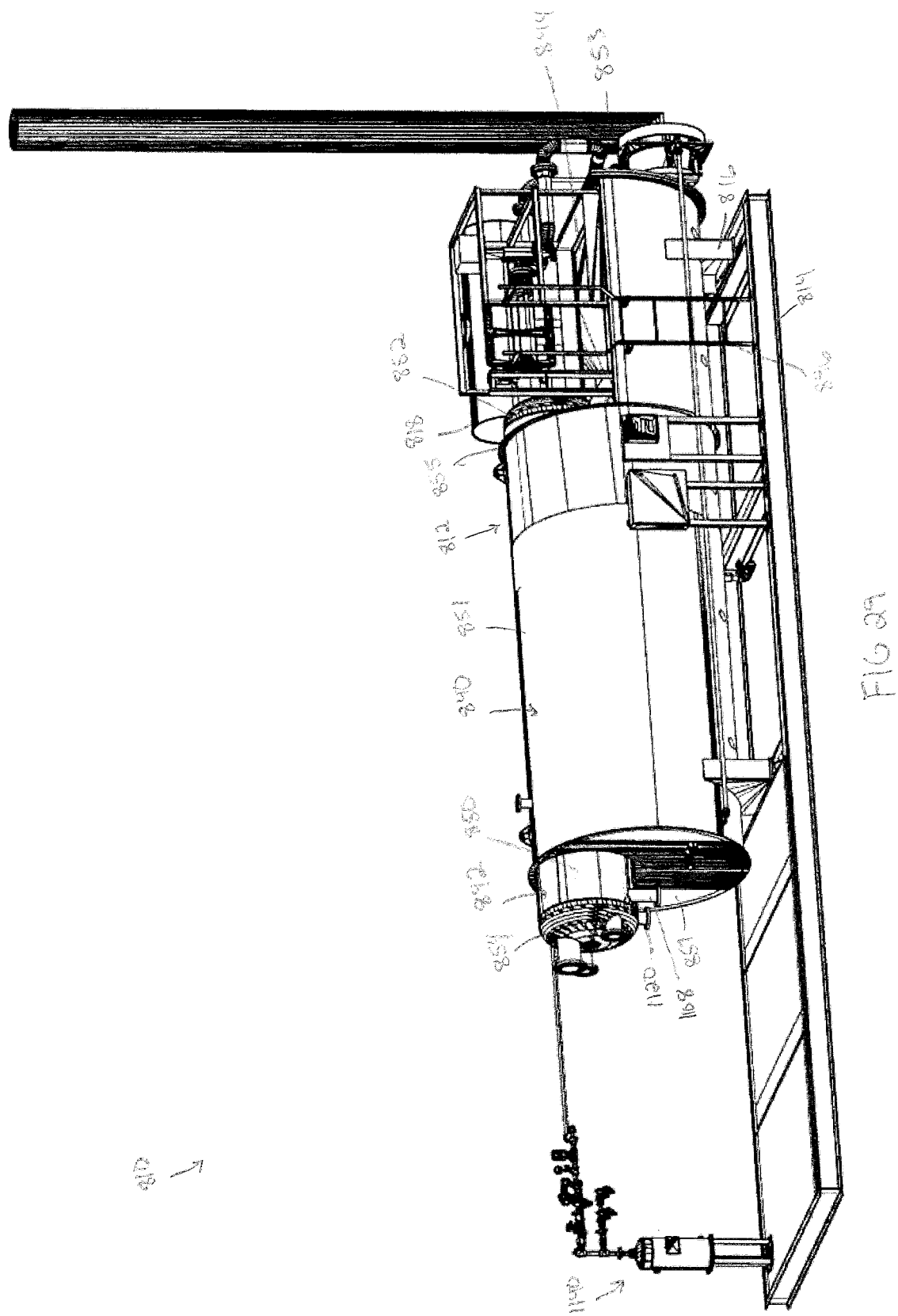
FIG. 29 is a perspective view of yet another exemplary separation assembly.
Figure 30:
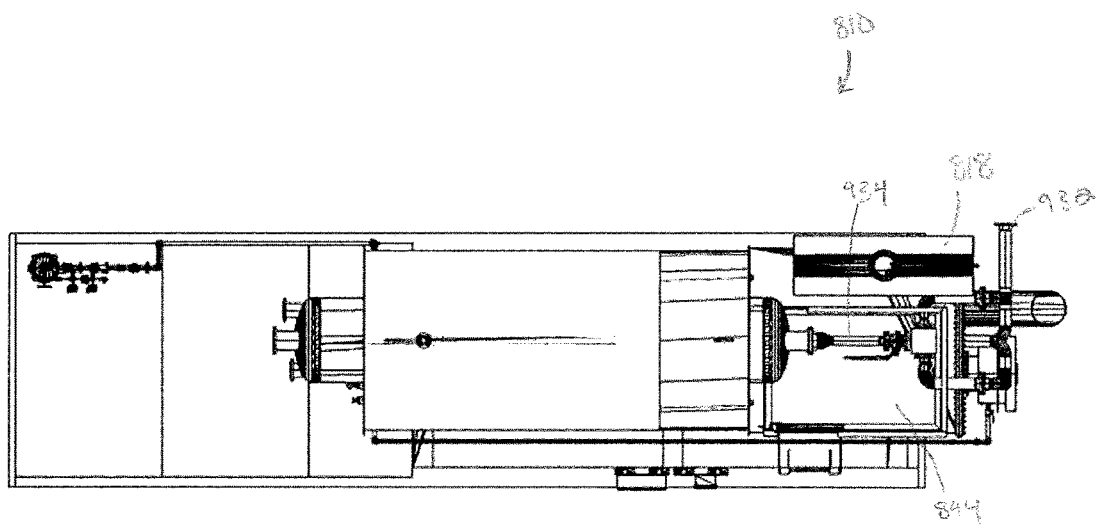
FIG. 30 is a top view of the separation assembly.
Figure 31:
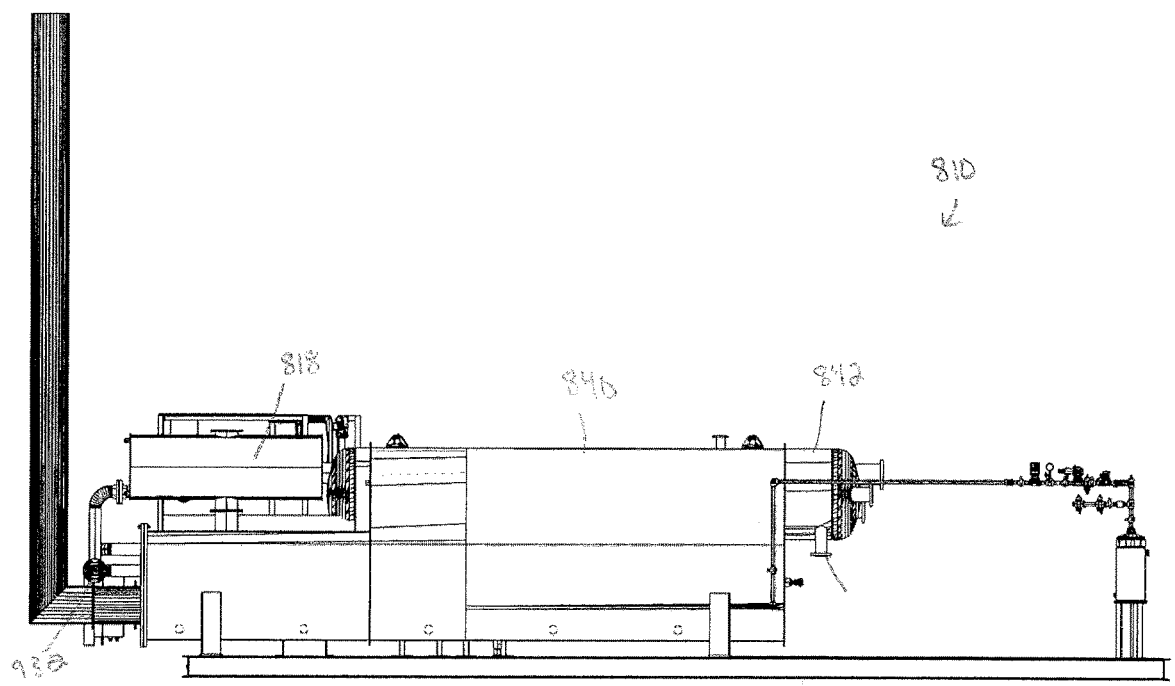
FIG. 31 is a left side view of the separation assembly.

As shown in FIG. 28, the inside of the vessel 412 is separated into a heating section 510, a separation section 512, which is a heated separation section, and a collection section 514. As shown, the heating section 510 is provided at a bottom of the vessel 412, the separation section 512 is provided above the heating section 510, and the collection section 514 is provided downstream of the separation section 512 proximate the head 454 such that all three sections are in one housing. A plate 516, which is a heat conducting plate, is provided in the vessel 412 separating the heating section 510 from the separation section 514 and a plate 518 is provided in the vessel 412 separating the heating section 510 from the collection section 514. The plate 516 is provided to be heated by a heating fluid, such as a glycol/water mixture, in the heating section 510 to provide indirect heat to the separation section 512.

Disposed in the heating section 510 is a coil assembly 530 including an inlet 532, and outlet 534, an inlet header 536, and outlet header 538, and a plurality of coils 540 connected to the inlet and outlet headers. The coil assembly 530 additionally includes a firetube 552 having the heater connection for connection to a heat source, such as burner 630, and an exhaust connection for connection to an exhaust stack 632. The system includes a suitable fuel train 740 having suitable conduits, regulators, valves, etc. for controlling the flow of gas to the burner.

The separation section 512 receives the heated process fluid at the inlet 484. Connected to the inlet 484 is an inlet diverter 650 that directs the process fluid back towards the end plate 452 to reduce the flow rate of the process fluid and to increase the liquid droplet residence time. Downstream of the inlet diverter 650 in the separation section 512 is a first separation baffle 660 proximate the inlet diverter 650, a second separation baffle 662 proximate an outlet area 664 of the separation section 512, and a vane section 666 disposed therebetween.

The collection section 514 is in communication with the outlet area 664 of the separation section 512 to receive the separated water, oil, and gas from the separation section. The collection section 514 includes a water collection section 700 adjacent the outlet area 664, an oil collection section 702 adjacent the water collection section 700 at the second end of the vessel 412, and a gas outlet 704 at a top of the vessel 412. Provided at the bottom of the vessel 412 in the water collection section 700 is a conduit 708 connected to a valve 710, such as a pressure control valve, and provided at the bottom of the vessel 412 in the oil collection section 702 is a conduit 720 connected to a valve 722, such as a pressure control valve. The gas outlet 704 is provided at the top of the vessel 412 above the oil collection section 702. The gas that exits the gas separation section of the second separation baffle 662 exits the outlet area 664 and flows to the gas outlet 704, where the gas flows through a conduit 730 to a valve 732, such as an isolation valve, and then to a gas meter 734 that can be connected to a line.

Turning now to FIGS. 29-35, an exemplary embodiment of the indirect heated separation assembly is shown at 810. The indirect heated separation assembly 810 is substantially the same as the above-referenced indirect heated separation assembly 10, and consequently the same reference numerals but indexed by 800 are used to denote structures corresponding to similar structures in the indirect heated separation assemblies. In addition, the foregoing description of the indirect heated separation assembly 10 is equally applicable to the indirect heated separation assembly 810 except as noted below and illustrated in the figures.

The indirect heated separation assembly 810 includes a vessel assembly 812, a base 814 configured to rest on a surface, legs 816 connected to the base 814 for supporting the vessel assembly 812, and an expansion tank assembly 818. The vessel assembly 812 includes an outer section 840 and an inner section 842 substantially surrounded by the outer section 840. The rear of the outer section 840 defines a platform 844 for an operator, which can be accessed via a ladder 846. The platform also has an area above which the expansion tank assembly 818 extends. The outer section 840 includes a sidewall 851, a first end plate 853 at the first end, a second end plate 855 spaced from the first end by the platform 844, and a second end plate 857. The inner section 842 includes a sidewall 850, a head 852 at a first end of the sidewall 850, and a head 854 at a second end of the sidewall 850.

As shown in FIG. 34, the inside of the vessel assembly 812 is separated into a heating section 910, a separation section 912, which is a heated separation section, and a collection section 914. As shown, the heating section 910 is provided in the outer section 840, the separation section 5912 is provided above the heating section 910 in the inner section 842, and the collection section 914 is provided downstream of the separation section 912 proximate the head 854. The bottom of the inner section 840 serves as a heat conducting plate separating the heating section 910 from the separation section 912 and is provided to be heated by a heating fluid, such as a glycol/water mixture, in the heating section 910 to provide indirect heat to the separation section 912. A plate 918, which can be substantially L-shaped separates the collection section 914 into a water collection section and an oil collection section, and the plate 918 serves as a weir for the oil collection section.

Disposed in the heating section 910 is a coil assembly 930 including an inlet 932, and outlet 934, an inlet header 936, and outlet header 938, and a plurality of coils 940 connected to the inlet and outlet headers. The coil assembly 930 additionally includes a firetube 952 having the heater connection for connection to a heat source, such as burner 1030, and an exhaust connection for connection to an exhaust stack 1032. The system includes a suitable fuel train 1140 having suitable conduits, regulators, valves, etc. for controlling the flow of gas to the burner.

The separation section 912 receives the heated process fluid at the inlet 884. Connected to the inlet 884 is an inlet diverter 1050 that directs the process fluid back towards the head 852 to reduce the flow rate of the process fluid and to increase the liquid droplet residence time. Downstream of the inlet diverter 1050 in the separation section 912 is a first separation baffle 1060 proximate the inlet diverter 1050, a vane section 1066 proximate an outlet area of the separation section 912, and a second separation baffle 1062 disposed therebetween. It will be appreciated that the vane section 1066 and the second separation baffle 1062 may be switched as disclosed above and the above may be switched has disclosed herein. The first separation baffle 1060, second separation baffle 1062, and the vane section 1066 are attached to an interior of the sidewall 850 in any suitable manner, such as by welding, fasteners, interference fit, etc. The first separation baffle 1060, second separation baffle 1062, and the vane section 1066 have bottom surfaces that are flat or substantially flat and are spaced from the bottom of the inner section 842 to allow liquid, such as water, to flow below the baffles and vane pack. The bottom surfaces of the first and second separation baffles 1060 and 1062 are spaced a first distance from the bottom of the inner section 842, and the bottom surface of the vane pack 1066 is spaced a second distance from the bottom of the inner section 842 greater than the first distance to serve as a liquid seal.

The collection section 914 is in communication with the outlet area of the separation section 912 to receive the separated water, oil, and gas from the separation section. The collection section 914 includes a water collection section 1100, an oil collection section 1102 separated from the water collection section by the plate 918, and a gas outlet 1104 at a top of the inner section 842. Provided at the bottom of the inner section 842 in the water collection section 1100 is a conduit 1108 connectable to a suitable valve, and provided at the bottom of the inner section 842 in the oil collection section 1102 is a conduit 1120 connectable to a suitable valve. The gas outlet 1104 is provided at the end of the inner section 842 in the oil collection section 1102.

The aforementioned systems, components, (e.g., separation vessel, baffles, coils, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An assembly comprising:
   a vessel having a heating section and a separation section;
   a plate separating the heating section from the separation section, the plate being configured to be heated by a heating fluid in the heating section to provide indirect heat to the separation section; and
   a coil assembly at least partially disposed in the heating section, the coil assembly including an inlet configured to receive a process fluid and an outlet in communication with an inlet of the separation section to direct the process fluid after heating to the separation section.

2. The assembly according to claim 1, wherein the coil assembly further includes an inlet header that receives the process fluid from the inlet and separates the process fluid into a plurality of streams, a plurality of coils connected to the inlet header to receive the plurality of streams, and an outlet header connected to the plurality of coils to combine the plurality of streams after heating and to deliver the process fluid to the outlet, and wherein the inlet header, plurality of coils, and outlet header are disposed in the heating section and configured to be submerged in the heating fluid.

3. The assembly according to claim 2, wherein the inlet and outlet headers each house a flow distribution baffle for maintaining a constant flow of the process fluid through the flow distribution baffles across a length of each of the inlet and outlet headers.

4. The assembly according to claim 3, wherein each flow distribution baffle includes a plurality of openings, and wherein a diameter of the openings proximate a central portion of each baffle is smaller than a diameter of the openings proximate ends of each baffle.

5. The assembly according to claim 1, wherein the coil assembly further includes a firetube having a heater connection for connection to a heat source and an exhaust connection for connection to an exhaust stack.

6. The assembly according to claim 1, further including a first baffle disposed in the separation section proximate the inlet of the separation section, a second baffle disposed in the separation section proximate an outlet of the separation section, and a vane section disposed therebetween for serving as a demister for gas flowing therethrough and as a coalescing device for oil flowing therethrough.

7. The assembly according to claim 6, wherein each of the first and second baffles includes a gas separation section including a plurality of gas openings extending through the baffle, and a liquid separation section below the gas separation section including a plurality of liquid openings extending through the baffle.

8. The assembly according to claim 7, wherein the plurality of gas openings each have smaller diameters than the plurality of liquid openings.

9. The assembly according to claim 6, wherein the vane section includes an upstream face having a frame extending around a periphery thereof and a downstream face having a frame extending around a periphery thereof, and wherein the frames include a plurality of openings extending therethrough to allow gas and oil to flow through the upstream and downstream faces at the frames.

10. The assembly according to claim 1, wherein the vessel further includes a collection section in communication with an outlet of the separation section, wherein the collection section includes a gas outlet, a water collection section, and an oil collection section separated from the water collection section by a weir plate.

11. The assembly according to claim 1, further including an expansion tank assembly in fluidic communication with the heating section.

12. The assembly according to claim 11, wherein the expansion tank assembly includes a tank positioned above the vessel, and at least one conduit extending from to tank through the separation section and opening into the heating section.

13. An assembly comprising:
a vessel having a heating section, a separation section positioned above the heating section, and a collection section in communication with an outlet of the separation section;
a plate disposed in the vessel forming a top of the heating section and a bottom of the separation section and configured to be heated by a heating fluid in the heating section to provide indirect heat to the separation section; and
a coil assembly including an inlet configured to receive a process fluid, an inlet header disposed in the heating section that receives the process fluid from the inlet and separates the process fluid into a plurality of streams, a plurality of coils disposed in the heating section and connected to the inlet header to receive the plurality of streams, an outlet header disposed in the heating section and connected to the plurality of coils to combine the plurality of streams after heating, and an outlet that receives the process fluid from the outlet header and is configured to direct the process fluid to the separation section.

14. The assembly according to claim 13, wherein the inlet header, the plurality of coils, and the outlet header are configured to be submerged in the heating fluid.

15. The assembly according to claim 13, wherein the inlet and outlet headers each house a flow distribution baffle for maintaining a constant flow of the process fluid through the flow distribution baffles across a length of each of the inlet and outlet headers.

16. The assembly according to claim 15, wherein each flow distribution baffle includes a plurality of openings, and wherein a diameter of the openings proximate a central portion of each baffle is smaller than a diameter of the openings proximate ends of each baffle.

17. The assembly according to claim 13, wherein the collection section includes a gas outlet, a water collection section for receiving fluid from the outlet of the separation section, and an oil collection section downstream of and separated from the water collection section by a weir plate.

* * * * *